US007226096B2

(12) United States Patent
Ito et al.

(10) Patent No.: US 7,226,096 B2
(45) Date of Patent: Jun. 5, 2007

(54) DOOR HANDLE DEVICE FOR VEHICLES

(75) Inventors: Hidehiro Ito, Wako (JP); Makoto Iwaki, Wako (JP); Masakatsu Nitawaki, Miyazaki-gun (JP); Hitoshi Kawano, Miyazaki-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/838,979

(22) Filed: May 5, 2004

(65) Prior Publication Data

US 2004/0222649 A1 Nov. 11, 2004

(30) Foreign Application Priority Data

May 9, 2003 (JP) ............................. 2003-131378
Jun. 10, 2003 (JP) ............................. 2003-164942
Jun. 11, 2003 (JP) ............................. 2003-165973

(51) Int. Cl.
*F16C 3/00* (2006.01)

(52) U.S. Cl. ........................... 292/336.3; 292/DIG. 23; 292/DIG. 31; 296/1.02

(58) Field of Classification Search ............. 292/336.3, 292/201, 216, DIG. 23, 347, DIG. 30, DIG. 31; 16/412, 436, 438; 296/1.02
See application file for complete search history.

(56) References Cited

U.S. PATENT DOCUMENTS 3,799,596 A * 3/1974 Nozomu et al. ...... 292/DIG. 22
3,967,844 A * 7/1976 Torii et al. ............... 292/336.3
5,340,174 A * 8/1994 Bender et al. ........... 292/336.3
5,460,419 A * 10/1995 Castoldi .................. 292/336.3
5,564,759 A * 10/1996 McNutt ................... 292/336.3
5,613,717 A * 3/1997 Ha ......................... 292/336.3
5,632,516 A * 5/1997 Schwab ................... 292/336.3
5,651,163 A * 7/1997 Tamaki .................... 292/336.3
5,706,554 A * 1/1998 Ruckert et al. .......... 292/336.3
5,794,994 A * 8/1998 Miyagawa et al. ...... 292/336.3
5,860,684 A * 1/1999 Mizuki .................... 292/336.3
6,073,397 A * 6/2000 Tanimoto et al. ........ 292/336.3
6,108,979 A * 8/2000 Saffran et al. ........... 292/336.3
6,192,725 B1 * 2/2001 Watson et al. ........... 292/336.3
D441,270 S * 5/2001 Ramsey et al. .............. D8/306
6,240,754 B1 * 6/2001 Petersen .............. 292/DIG. 23
6,241,294 B1 * 6/2001 Young et al. ............ 292/336.3
6,454,325 B1 * 9/2002 Ramsey et al. .......... 292/336.3
6,530,251 B1 * 3/2003 Dimig ...................... 292/336.3
6,644,074 B2 * 11/2003 Monig ...................... 292/336.3
6,752,440 B2 * 6/2004 Spurr ....................... 292/336.3

FOREIGN PATENT DOCUMENTS

| | | |
|---|---|---|
| JP | 6-25569 | 7/1994 |
| JP | 8-93278 | 4/1996 |
| JP | 11-200669 | 7/1999 |
| JP | 2003-41811 | 2/2003 |

* cited by examiner

*Primary Examiner*—Brian E. Glessner
*Assistant Examiner*—Christopher Boswell
(74) *Attorney, Agent, or Firm*—Rankin, Hill, Porter & Clark LLP

(57) ABSTRACT

A door handle device for vehicles includes a handle body positioned on an outer surface of a vehicle door and lifted to be pulled back when the vehicle door is opened. The handle body is provided with a finger rest which extends to at least three directions of four directions including up, down, right and left directions.

22 Claims, 29 Drawing Sheets

(a)

(b)

(a)

(b)

(a)

(b)

DOOR HANDLE DEVICE FOR VEHICLES

BACKGROUND OF THE INVENTION

The present invention relates to door handle devices for vehicles, and particularly to techniques which improve the operationality thereof.

Various types of door handle devices (outer handle devices) have been used for vehicles such as automobile, to open the doors from the outside. Generally, door handle devices have functions to disengage the door catch device as well as to operate as a door pull for opening the door. The door handle devices can be classified into three types in which: a flap type handle body is lifted up, such as disclosed in Japanese Laid-open Patent Application No.11-200669 (paragraphs [0003] to [0004], and FIG. 4); a flap type handle body is lifted in the rightward or leftward direction, such as disclosed in Japanese Laid-open Patent Application No.8-093278 (claim 1, paragraphs [0002] to [0003], and FIG. 1); and a grip type door handle is held and then pulled back, such as disclosed in Japanese Laid-open Patent Application No.2003-041811 (claim 1, paragraphs [0013] to [0014], and FIG. 3).

When the driver or the like manipulates the handle body of the conventional door handle devices, it is necessary to insert his/her fingers underneath or sideward of the handle body or to hold the handle body from top and bottom. However, if the vehicle is used for a commuting purpose such as for shopping in town, the handle body is manipulated mainly by a housewife with shopping bags or a baby. For this reason, the conventional door handle devices have a difficulty in the operationality.

For example, when a housewife holds a baby, etc. with her both hands engaged, she has to open the door by inserting her fingers from top or side of the door handle or from a diagonal direction of the door handle. In the vehicle equipped with the conventional door handle device, it is necessary to change the holding posture of the baby upon opening the door.

In view of the above, the present invention in one preferred mode seeks to provide a door handle device for vehicles, which improves the operationality.

Further, as shown in FIG. 1, the conventional door handle device 304 includes a handle base 321, a handle body 324 pivotally supported by the handle base 321 through a support shaft 323 so as to turn around the support shaft 323, and a rod 352 connecting the handle body 324 and a door catch device (not shown), so that the manipulating force applied to the handle body 324 is transmitted to the door catch through the rod 352.

However, the above conventional door handle device requires a relatively large manipulation amount of the handle body 324 for releasing the door catch device because it is difficult for a compact car to provide a large space at the reverse side of a door panel 310 and because of its leverage. This leads to deteriorated operational feel of the handle body 324 and a slippage of fingers 370 from the finger rest 340 because the turn angle of the handle body 324 becomes closer to the angle at which the fingers 370 pull open the door. Further, a passenger is likely to apply an unnecessary large force upon manipulation of the handle body 324, which disadvantageously deforms the finger rest 340 of the handle body 324.

With the foregoing drawbacks of the prior art in view, the present invention in one preferred mode seeks to provide a door handle device for vehicles, which improves the operationality.

Further, in the door handle device for vehicles disclosed in Japanese Laid-open Patent Application No.11-200669, the door panel has a substantially rectangular opening with first and second sides which are parallel to each other, and a handle case for rotatably supporting a door handle abuts on the inner surface of the door panel at an outer side of the first side. The handle case also has a plurality of engaging nails which engage with the door panel at a part corresponding to the second side. The handle case is fixed to the door panel by a single screw member.

In this door handle device for vehicles, the rotating movement of the door handle in a direction to open the door can be restricted with part of the door handle abutted against the handle case. However, the manipulating force may be applied further to the door handle that is in the restricted position, so that in the conventional door handle device local stress is focused on the fixing part between the handle case and the door panel and on the engaging part between the plurality of engaging nails of the handle case and the door panel, which is likely to cause a deformation of the door panel at the periphery of the opening.

In view of the above, the present invention in one preferred mode seeks to provide a door handle device for vehicles, which prevents stress from being locally focused on the door panel even if the manipulating force is applied further to the door handle in the restricted position (rotational movement restriction position).

SUMMARY OF THE INVENTION

According to one aspect of the present invention, there is provided a door handle device for vehicles comprising: a handle body positioned on an outer surface of a vehicle door and lifted to be pulled back when the vehicle door is opened, wherein the handle body is provided with a finger rest which extends to at least three directions of four directions including up, down, right and left directions.

With this construction of the door handle device, the driver or the like can insert her fingertips into the handle body from relatively arbitrary directions, thereby decreasing the necessity for changing the holding posture of a baby or shopping bags when the vehicle door is opened.

In the aforementioned door handle device, with a finger rest space the handle body may be accommodated in a handle accommodating recess formed in the vehicle door.

With this construction of the door handle device, it is possible to decrease the protrusion amount of the handle body from the door surface, thereby achieving a flash surface design.

In the aforementioned door handle device, the finger rest of the handle body may have an arcuate profile.

With this construction of the door handle device, the driver or the like can insert her fingertips into the handle body not only from up, down, right and left directions but also from arbitrary diagonal directions.

In the aforementioned door handle device, the finger rest of the handle body may have a polygonal profile.

With this construction of the door handle device, the handle body matches the design of a square-shaped vehicle. Further, the driver or the like can insert her fingertips into the handle body from up and down directions or right and left directions.

The aforementioned door handle device may comprise: a handle base for supporting the handle body; a support arm extending from a reverse surface of the handle body and pivotally supported by the handle base; and a reinforcement rib positioned between the handle body and the support arm.

With this construction of the door handle device, even if an excessive manipulating force is applied to the finger rest, a deformation or cracking hardly occurs at a part between the handle body and the support arm.

In the aforementioned door handle device, the handle body may have a cover extending along a contour of the finger rest.

With this construction of the door handle device, stiffness of the handle body can be improved without deteriorating operationality of the finger rest. This can effectively prevent a deformation of the handle body, even if an excessive manipulating force is applied to the finger rest. Further, because the handle body can be formed thinner while retaining a certain stiffness, even if the handle accommodating recess is not deep enough due to the inner handle within the vehicle door, it is possible to decrease the protrusion amount of the handle body from the door surface.

In the aforementioned door handle device, a periphery of the handle body may curve inward.

With this construction of the door handle device, a slippage of fingers from the finger rest hardly occurs, and stiffness of the handle body can be increased to thereby prevent a deformation of the handle body.

According to another aspect of the present invention, there is provided a door handle device for vehicles comprising: a handle body positioned on an outer surface of a vehicle door and lifted to disengage from a door catch device when the vehicle door is opened; a finger rest provided at the handle body for lifting the handle body; a handle base pivotally supporting the handle body through a rotating shaft such that the handle body turns around the rotating shaft; a connecting lever pivotally supported by the handle base through a pivot shaft and having an input portion that is engaged with the handle body and an output portion that is engaged with the door catch device; and an engagement portion provided at the handle body and engaged with the input portion of the connecting lever, wherein the pivot shaft is positioned intermediate between the finger rest and the rotating shaft.

With this construction of the door handle device, even if the lifting amount of the handle body is set for a small amount, the rotating amount of the connecting lever (displacement amount of the rod, etc.) can be sufficiently large, such as by positioning the engagement portion of the handle body remotely from the rotating shaft of the handle body or by setting the distance between the pivot shaft and the engagement portion smaller than the distance between pivot shaft and the rotating shaft.

In the aforementioned door handle device, the engagement portion may slidably engage with the input portion of the connecting lever.

With this construction of the door handle device, engagement between the handle body and the connecting lever can be readily made, thereby improving the degree of freedom for design.

In the aforementioned door handle device, the connecting lever may be positioned such that a distance between the output portion and the pivot shaft becomes greater than a distance between the input portion and the pivot shaft.

With this construction of the door handle device, the displacement amount of the rod, etc. connected to the output portion of the connecting lever can be increased against the displacement amount of the engagement portion of the handle body, thereby decreasing the lifting amount of the handle body.

In the aforementioned door handle device, at least one of the input portion of the connecting lever and the engagement portion of the handle body may be provided with an elastic member at its engagement surface.

With this construction of the door handle device, noise or friction caused by a contact of the parts can be restricted at the time of operation of the handle body, thereby improving the operational feel of the handle body.

In the aforementioned door handle device, at least one of the input portion of the connecting lever and the engagement portion of the handle body may be provided with a low friction member at its engagement surface.

With this construction of the door handle device, friction resistance between the parts can be decreased at the time of operation of the handle body, thereby leading to a smooth operation is and improved durability.

According to still another aspect of the present invention, there is provided a door handle device for vehicles comprising: a handle case including a case main body which abuts on an outer surface of a door panel at a periphery of an opening provided in the door panel, and a pair of supporting arms integral with the case main body and extending through the opening toward an interior of a vehicle, the handle case being fixed to the door panel; and a door handle including a handle positioned outside of the vehicle and being pivotally supported by the supporting arms of the handle case through a support shaft, wherein the opening is substantially rectangular in shape having a first side and a second side which are substantially parallel to an axis of the support shaft with the first side sandwiched between the support shaft and the second side, wherein a reinforcement plate made of metal with a sufficient stiffness includes a sandwiched portion for being sandwiched between the door panel and the supporting arms at an outer side of the first side, and a mounting plate portion for sandwiching the door panel against the case main body at an outer side of the second side, and wherein the reinforcement plate abuts on an inner surface of the door panel at the periphery of the opening and is threadedly engaged with the case main body by a screw member inserted through the mounting plate portion and the door panel.

With this construction of the door handle device, because the sandwiched portion of the reinforcement plate is sandwiched between the door panel and the supporting arms of the handle case at the outer side of the first side of the opening, the reinforcement plate and the handle case can be reliably fixed to the door panel only by fastening the mounting plate portion, which sandwiches the door panel against the case main body at the outer side of the second side of the opening, to the case main body. If a further manipulating force is applied to the door handle that is in the rotation restricted position, a load from the handle case is transmitted to the reinforcement plate, which is abutted on the inner surface of the door panel at the periphery of the opening, stress can be dispersed around the periphery of the opening, thereby preventing a local stress being focused on the door panel.

In the aforementioned door handle device, the reinforcement plate may include an arm support portion which abuts on the supporting arms from an opposite side of the door panel at a position adjacent to the support shaft.

With this construction of the door handle device, even if a further manipulating force is applied to the door handle that is in the rotation restricted position, the arm support portion of the reinforcement plate can receive the load applied to the supporting arms, thereby preventing a local stress being focused in the proximity of the support shaft of the supporting arms.

In the aforementioned door handle device, the case main body may include positioning projections for being inserted into corresponding positioning holes provided in the door panel and the mounting plate portion at a position outside the second side.

With this construction of the door handle device, upon mounting the handle case and the reinforcement plate to the door panel, the positioning can be made only inserting the positioning projections into the positioning holes provided in the mounting plate portion of the reinforcement plate and the door panel, which can ease the screwing operation of the screw member. This can improve the assembling efficiency.

BRIEF DESCRIPTION OF THE DRAWINGS

Preferred embodiments of the present invention will be described below, by way of example only, with reference to the accompanying drawings, in which.

DETAILED DESCRIPTION OF THE INVENTION

FIRST EMBODIMENT

With reference to FIGS. 2 to 19, a door handle device according to the present invention will be described as one preferred embodiment which is applied to an automobile (compact car).

Figure 1:
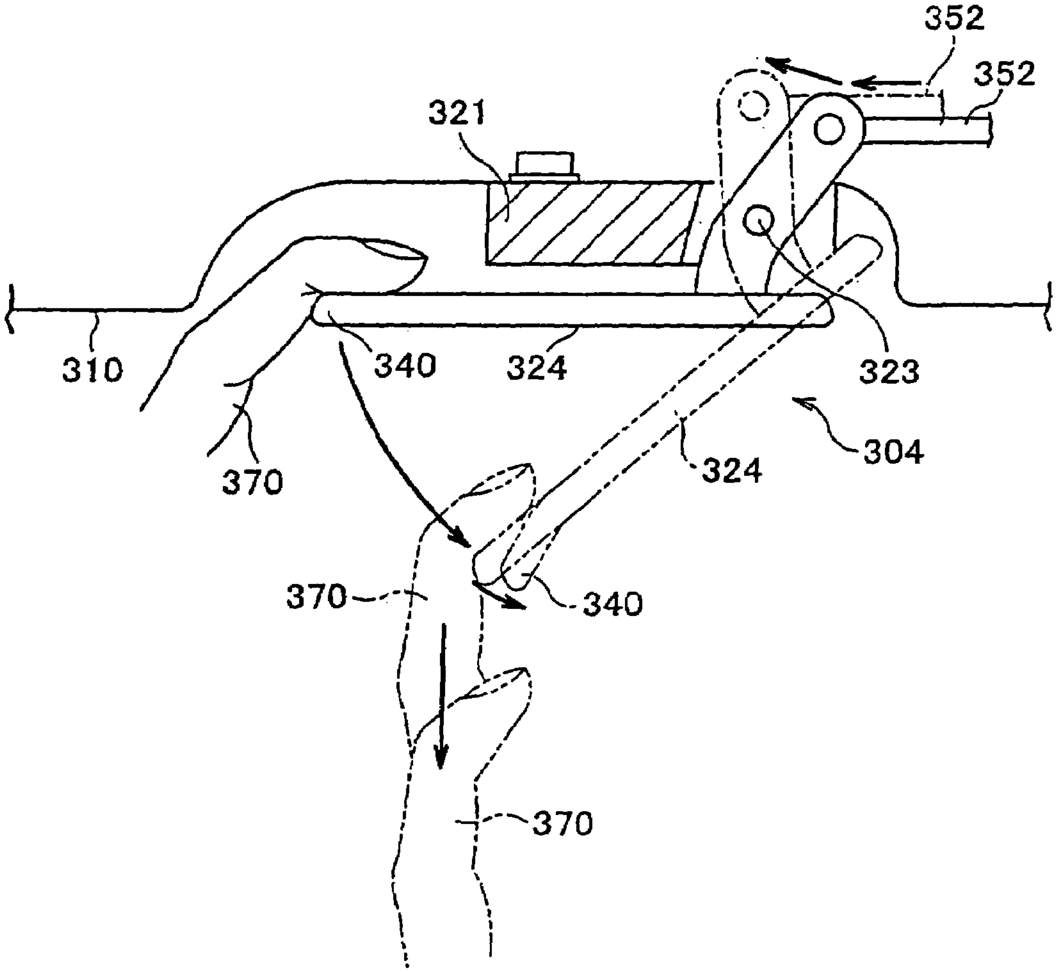
FIG. 1 PRIOR ART
FIG. 1 is a view for explaining operation of the conventional door handle device.
Figure 2:
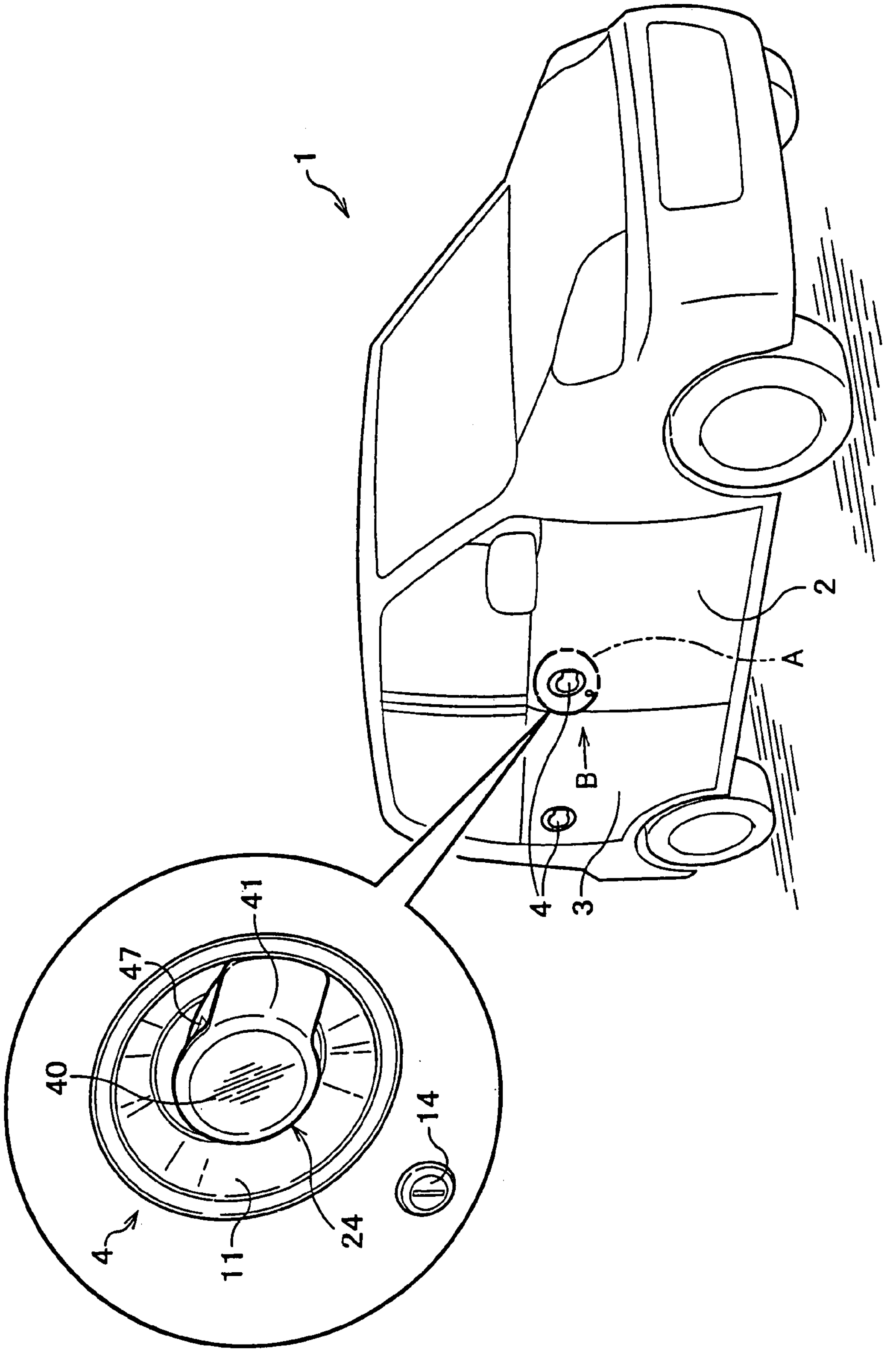
FIG. 2 is a perspective view of a vehicle according to one preferred embodiment of the present invention.
Figure 4:
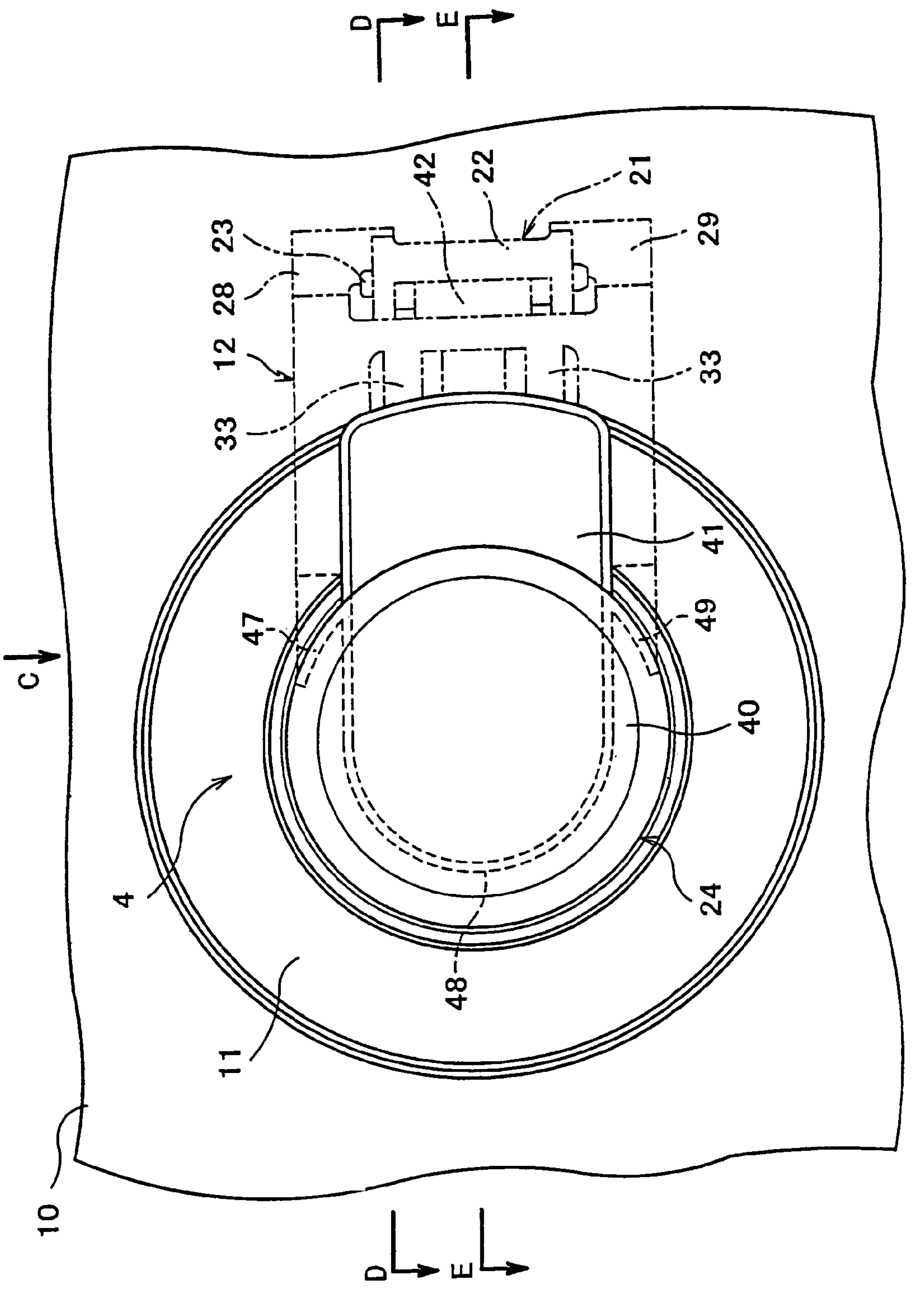
FIG. 4 is an enlarged view as viewed from the arrow B of FIG. 1.

When explaining the parts in figures, left side of FIGS. 2 and 4 is referred to as rear side, and top side of FIG. 4 is referred to as top side.

Figure 3:
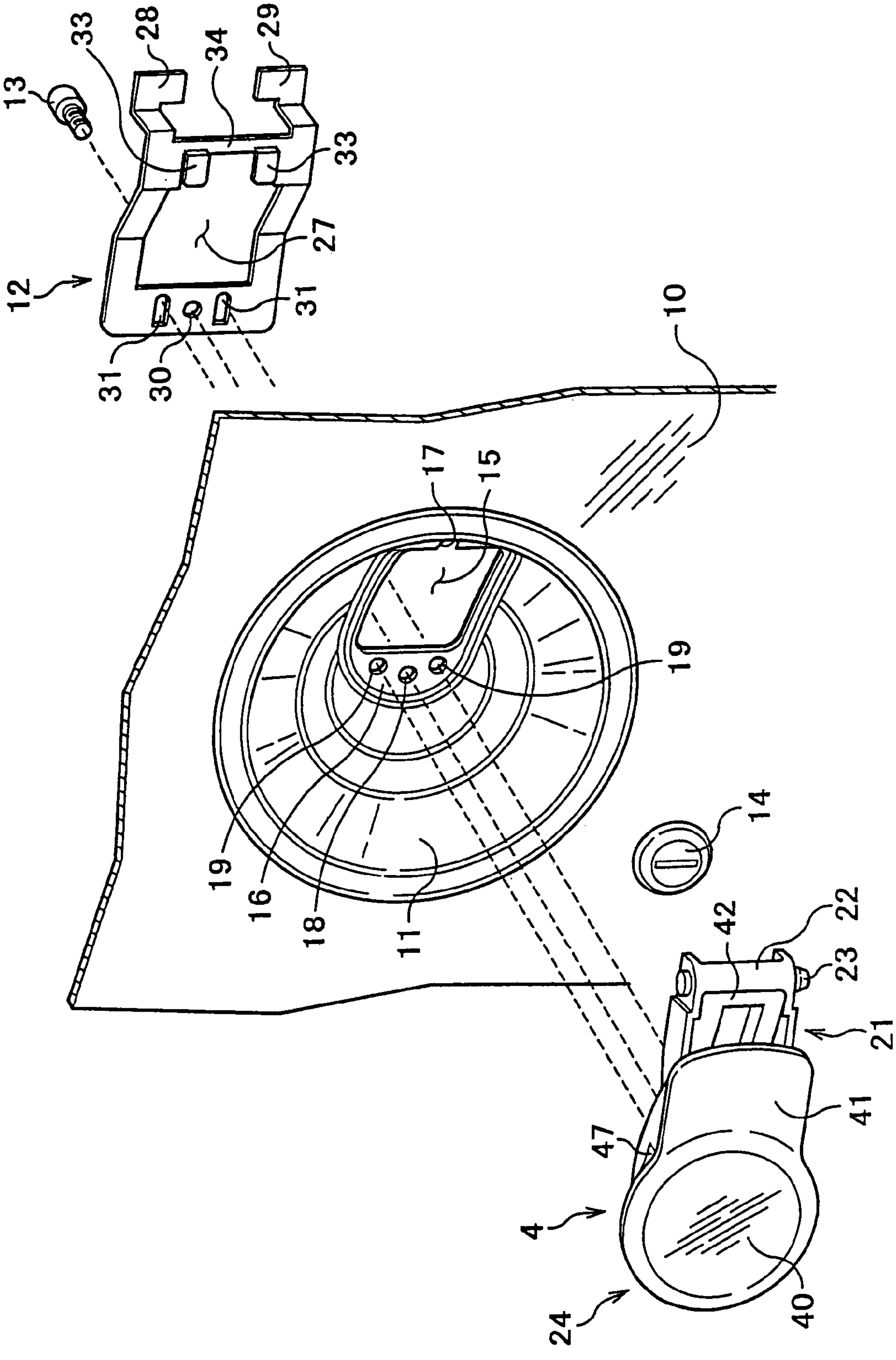
FIG. 3 is an exploded perspective view with the A part of FIG. 1 partly enlarged.
Figure 5:
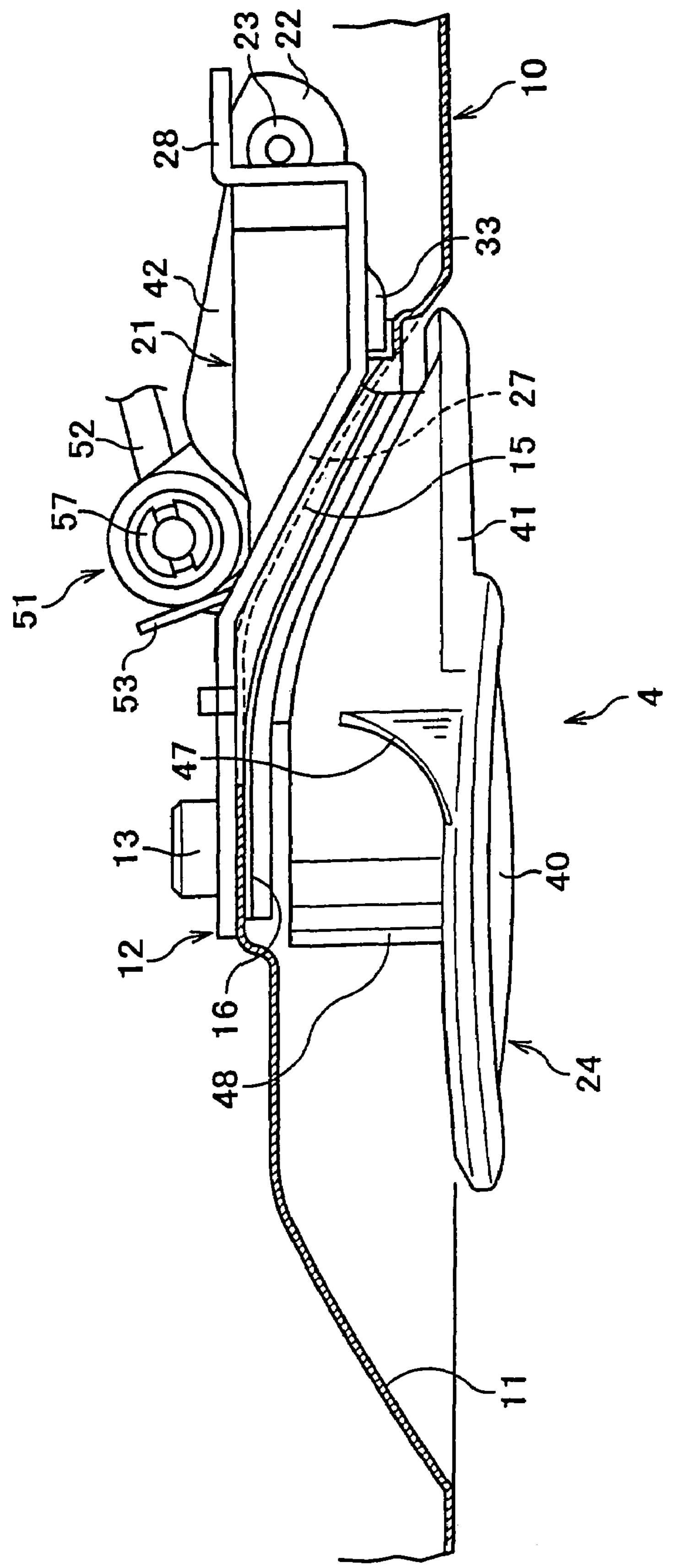
FIG. 5 is a view as viewed from the arrow C of FIG. 4 with the door panel shown in section.

As shown in FIG. 2, a front door 2 and a rear door 3 are provided at the side surface of the vehicle 1. Provided at a rear side of each door 2, 3 is a door handle device 4. As seen in FIGS. 3 and 5, a handle accommodating recess 11 having a dish-shaped cross section is formed by pressing at a door panel 10 which forms the front door 2. The door handle device 4 is accommodated in the handle accommodating recess 11. In FIG. 3, the reference numeral 12 denotes a supporting bracket made by pressing a steel plate. The supporting bracket 12 is fixed to the reverse surface of the door panel 10. The reference numerals 13 and 14 respectively denote a mounting bolt for the door handle device 4, and a cylinder lock for locking and unlocking the door lock.

As seen in FIG. 3, the handle accommodating recess 11 of the door panel 10 includes a mounting hole 15 substantially in the form of a rectangle, and a supporting seat surface 16 and an engagement recess 17 which are used for fixing the door handle device 4. The front part of the door handle device 4 is for being inserted into the mounting hole 15. Provided in the supporting seat surface 16 are a bolt hole 18, and a pair of positioning holes 19 which are positioned vertically in a manner sandwiching the bolt hole 18.

Figure 6:
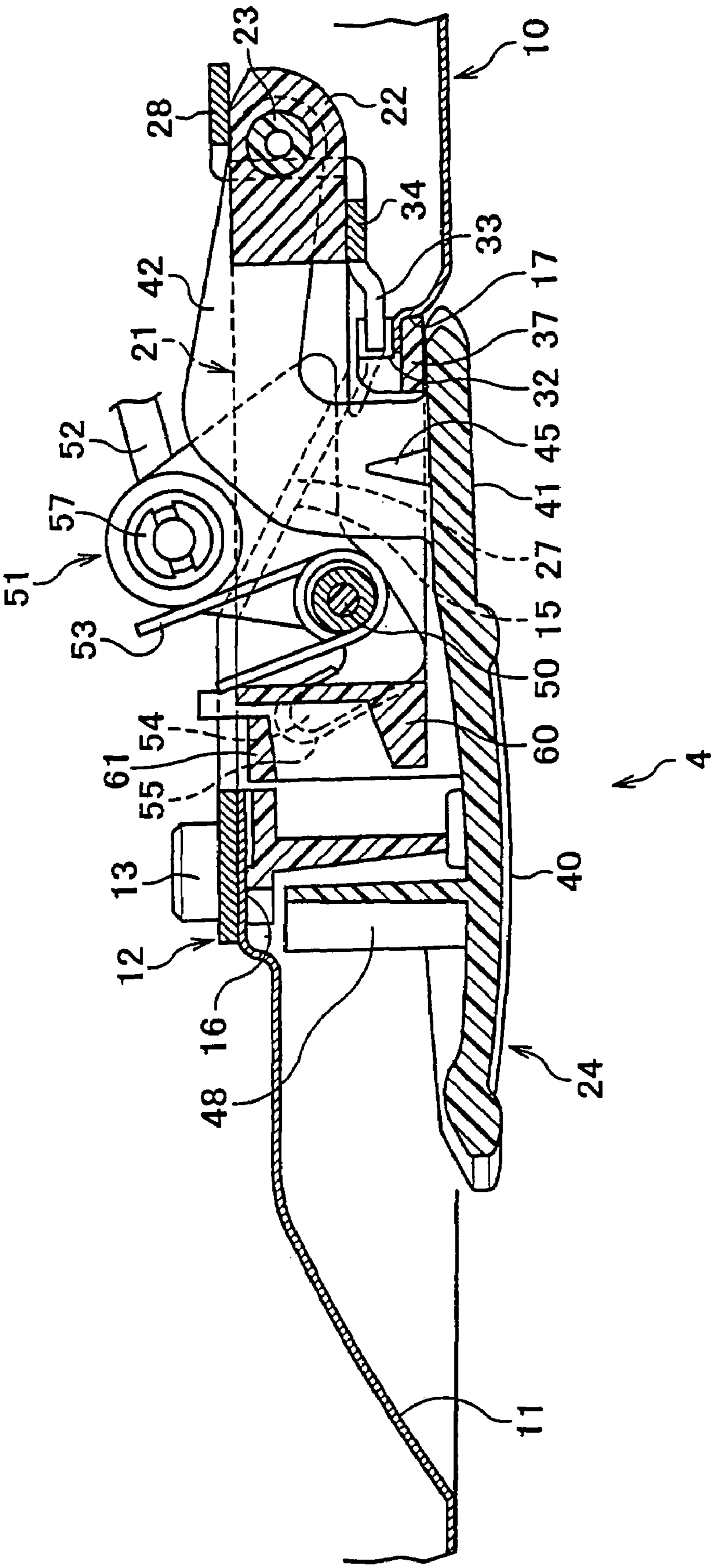
FIG. 6 is a sectional view taken along the line D—D of FIG. 4.

As shown in FIGS. 3 and 6, the door handle device 4 mainly includes a handle base 21 made by injection molding of a plastic material, a support shaft (rotating shaft) 23 made of steel, plastic, etc. and vertically extending through the front part 22 of the handle base 21, and a handle body 24 made by injection molding of a plastic material and pivotally supported by the handle base 21 through the support shaft 23.

The supporting bracket 12 is fixed to the door panel 10 with its rear part tightly contacting with the reverse surface of the handle accommodating recess 11. The supporting bracket 12 has a retaining hole 27 substantially in the form of a rectangle at a position corresponding to the mounting hole 15, so that the handle base 21 is fitted into the retaining hole 27 with a play.

The supporting bracket 12 has at its front part a pair of upper and lower retaining strips 28, 29 substantially bent in the shape of Z, and at the rear end part is provided a bolt hole 30 and a pair of upper and lower positioning oblong holes 31 which are positioned vertically in a manner sandwiching the bolt hole 30. The supporting bracket 12 further includes a pair of upper and lower abutting members 33 which abuts against the inner surface of the door panel 10. In order to prevent noise (contact noise) from occurring at the time of abutment between the abutting members 33 and the inner surface of the door panel 10, nonwoven fabric 32 is attached to the front and reverse surfaces of each abutting member 33.

Figure 9:
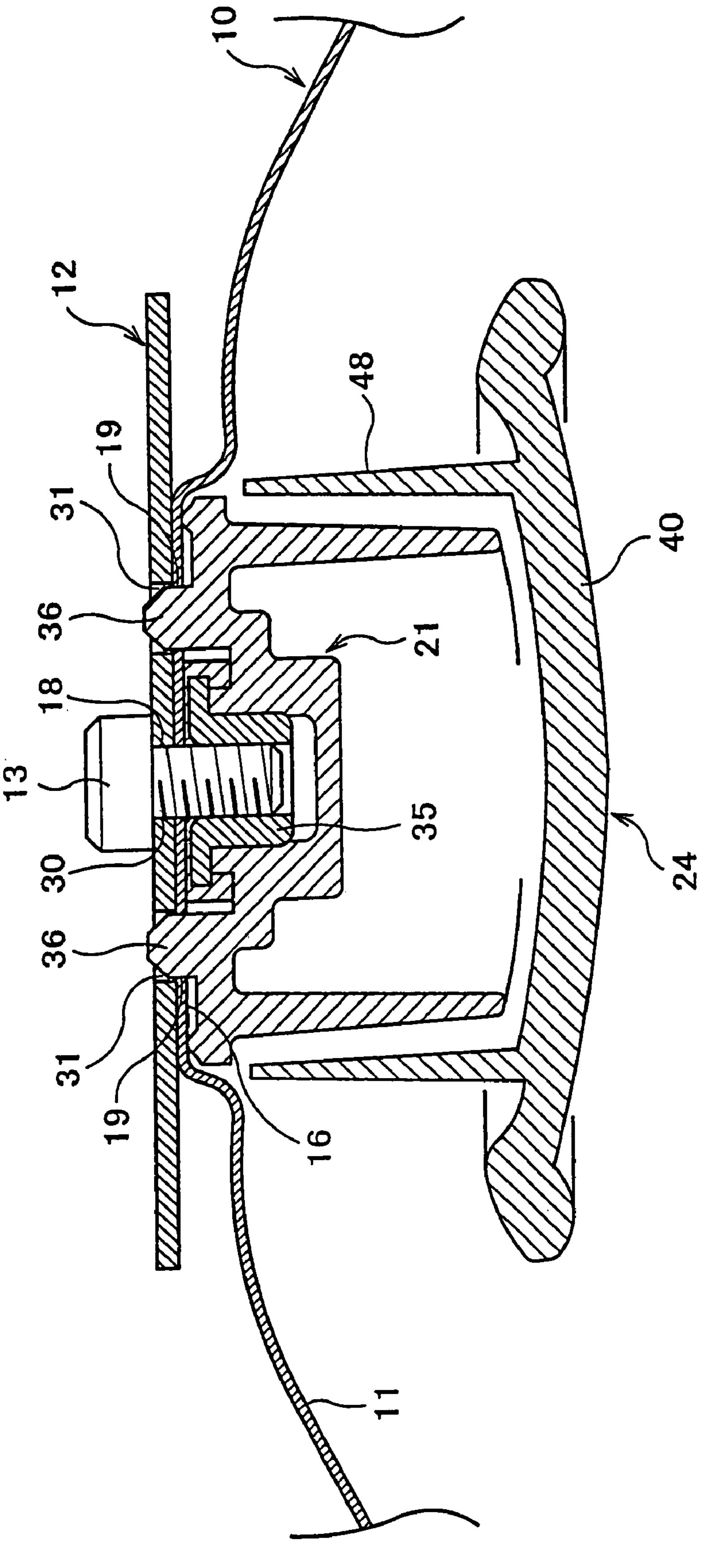
FIG. 9 is a sectional view taken along the line F—F of FIG. 7.

As shown in FIG. 6, the front part of the handle base 21 extends through the mounting hole 15 of the door panel 10 and the retaining hole 27 of the supporting bracket 12 from the outside toward the interior of the vehicle 1, and as shown in FIG. 4, the front end part 22 of the handle base 21 is sandwiched between the front fringe part 34 and the retaining strips 28, 29 of the supporting bracket 12. The handle base 21 temporally retains a metal nut 35 at the rear end thereof as illustrated in FIG. 9. Further, the handle base 21 has two positioning projections 36 which are vertically positioned in a manner sandwiching the nut 35, and an engagement projection 37 (FIG. 7) in a position corresponding to the engagement recess 17 of the handle accommodating recess 11. The nut 35 may be embedded during the injection molding of the handle base 21, or alternatively, the nut 35 maybe fitted and glued into the handle base 21 after the handle base 21 is formed by injection molding.

Figure 7:
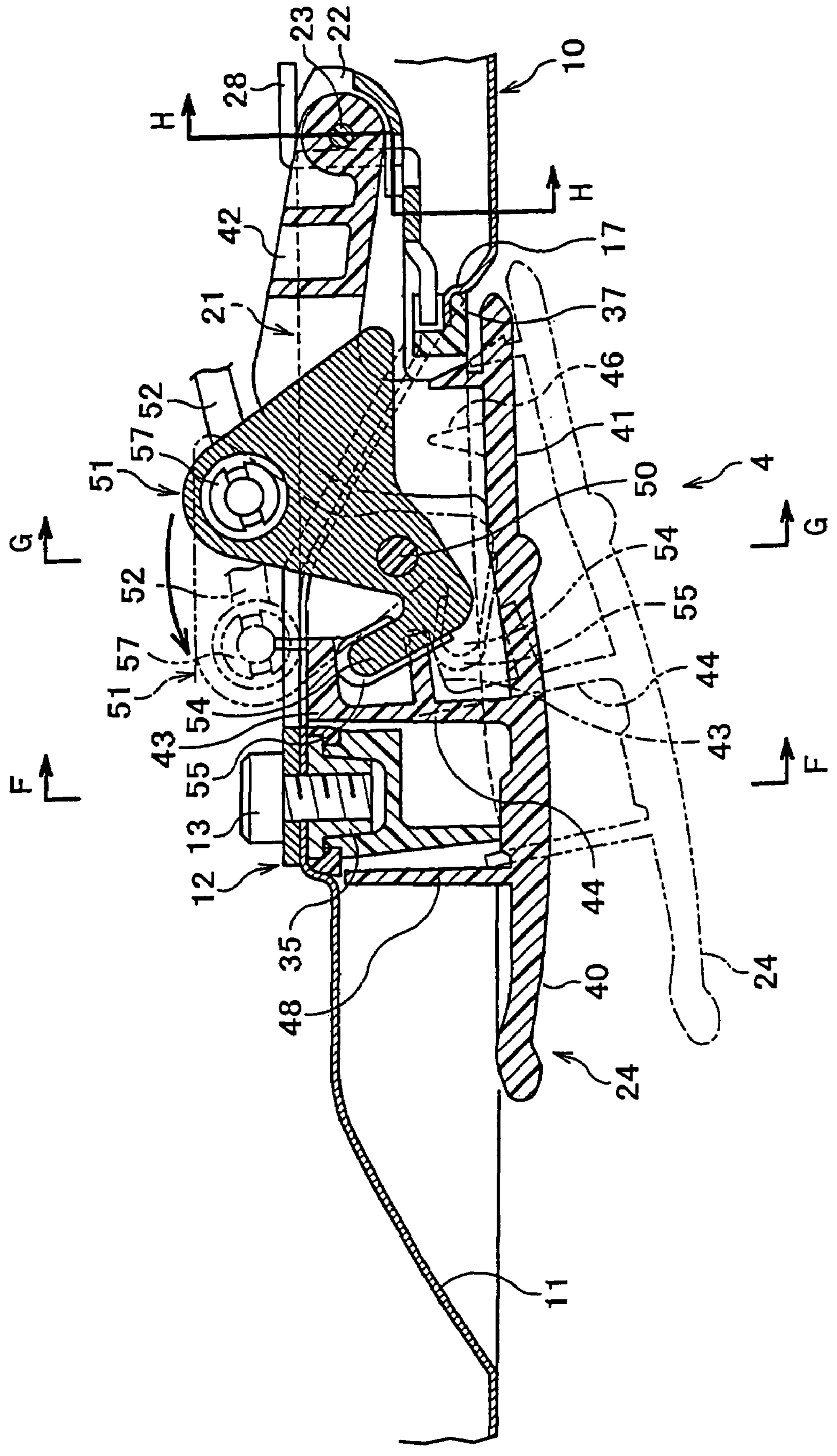
FIG. 7 is a sectional view taken along the line E—E of FIG. 4.

As seen in FIG. 9, the rear part of the handle base 21 is positioned against the door panel 10 in such a manner that the positioning projections 36 penetrate through the positioning holes 19 of the door panel 10 and the positioning oblong holes 31 of the supporting bracket 12. Also, as seen in FIGS. 6 and 7, the front part of the handle base 21 is positioned against the door panel 10 in such a manner that the engagement projection 37 of the handle base 21 engages with the engagement recess 17 of the handle accommodating recess 11. The supporting bracket 12 and the handle base 21 are fixed to the door panel 10 with the mounting bolt 13 penetrating through the bolt hole 18 of the door panel 10 and the bolt hole 30 of the supporting bracket 12 and threadedly engaged with the nut 35, as illustrated in FIG. 9.

Figure 8:
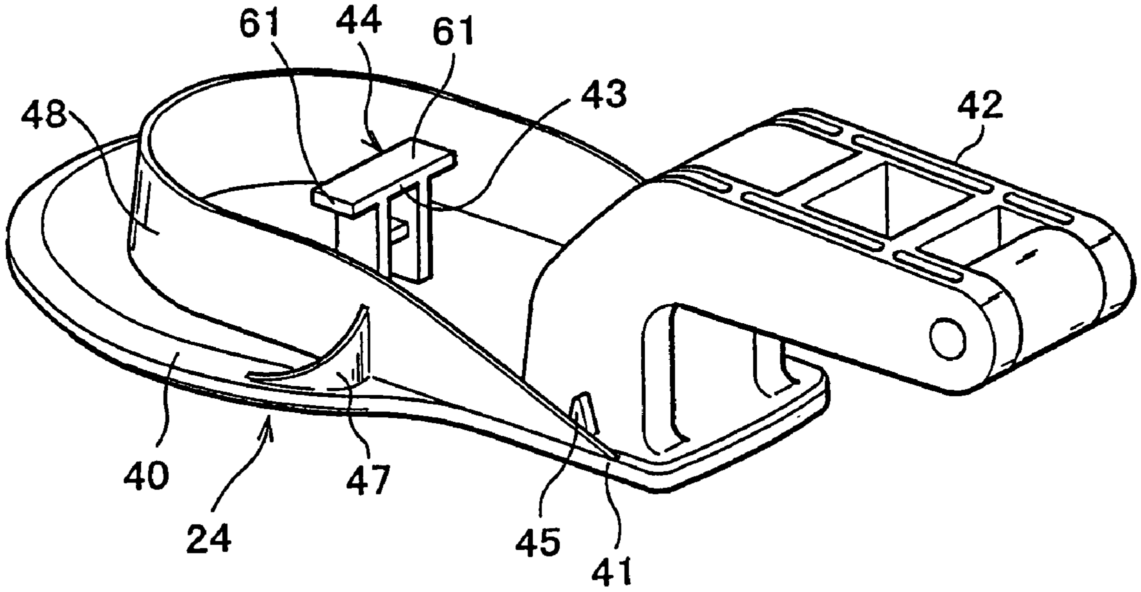
FIG. 8 is a perspective view of the handle body as viewed from the reverse side thereof.

As shown in FIGS. 4, 7 and 8, the handle body 24 includes a circular plate-like finger rest 40 with its peripheral edge curved inwardly, and a substantially rectangular-shaped base 41 continuously extending from the finger rest 40. A support arm 42 having an L-shaped cross section extends integrally from the reverse surface of the base 41. As seen in FIGS. 7 and 8, provided at the reverse surface of the finger rest 40 are an abutment arm 44 having an abutment projection (engagement portion) 43, and a cover 48 substantially in U-shaped cross section. In this preferred embodiment, a pair of upper and lower reinforcement ribs 45, 46 (FIGS. 6 and 7) is provided between the base 41 of the handle body 24 and the side surface of the support arm 42. Also, as seen in FIGS. 2 to 7, a pair of upper and lower reinforcement ribs 47, 49 (FIGS. 6 and 7) is provided between the finger rest 40 of the handle body 24 and the cover 48.

Figure 10:
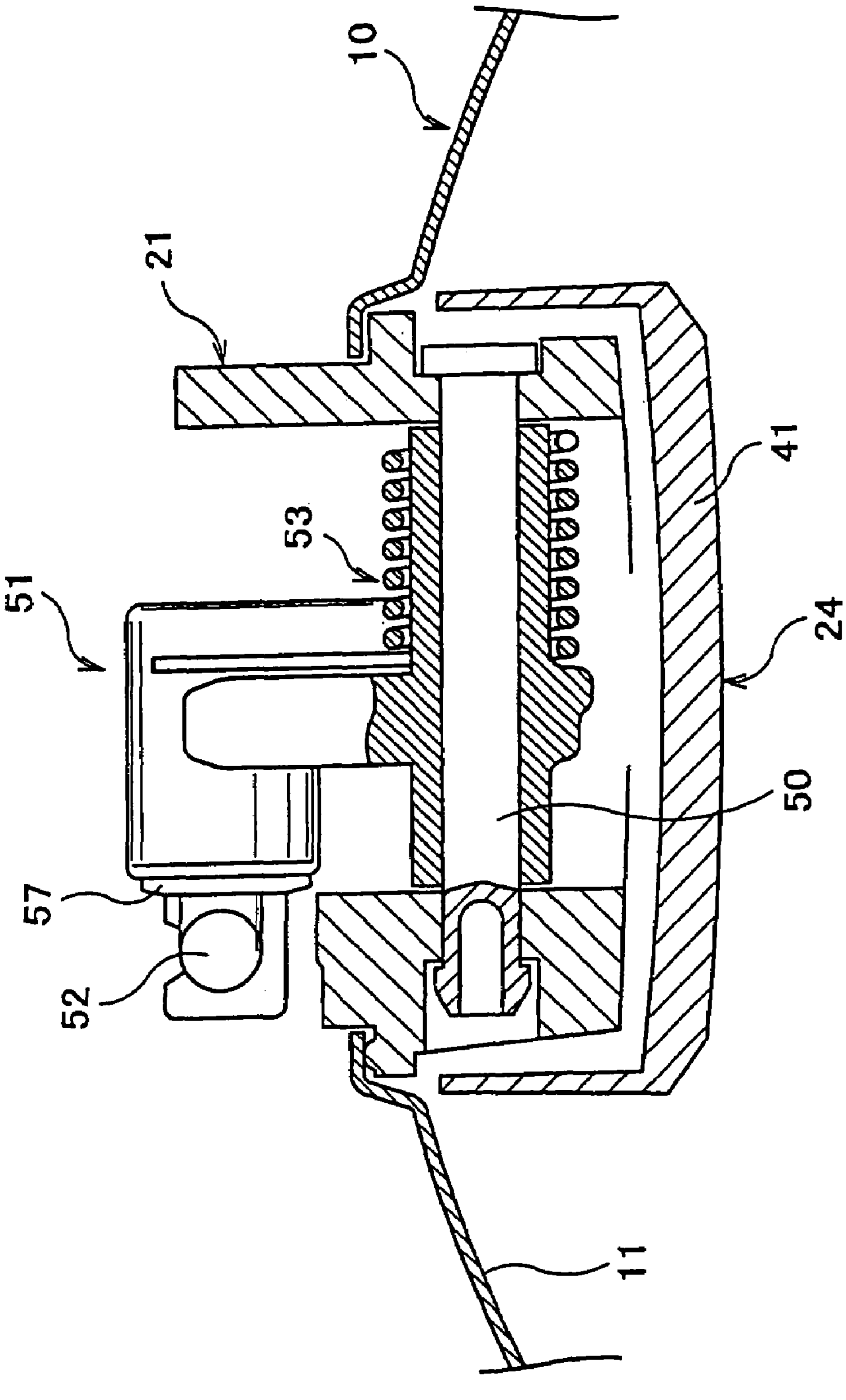
FIG. 10 is a sectional view taken along the line G—G of FIG. 7.
Figure 11:
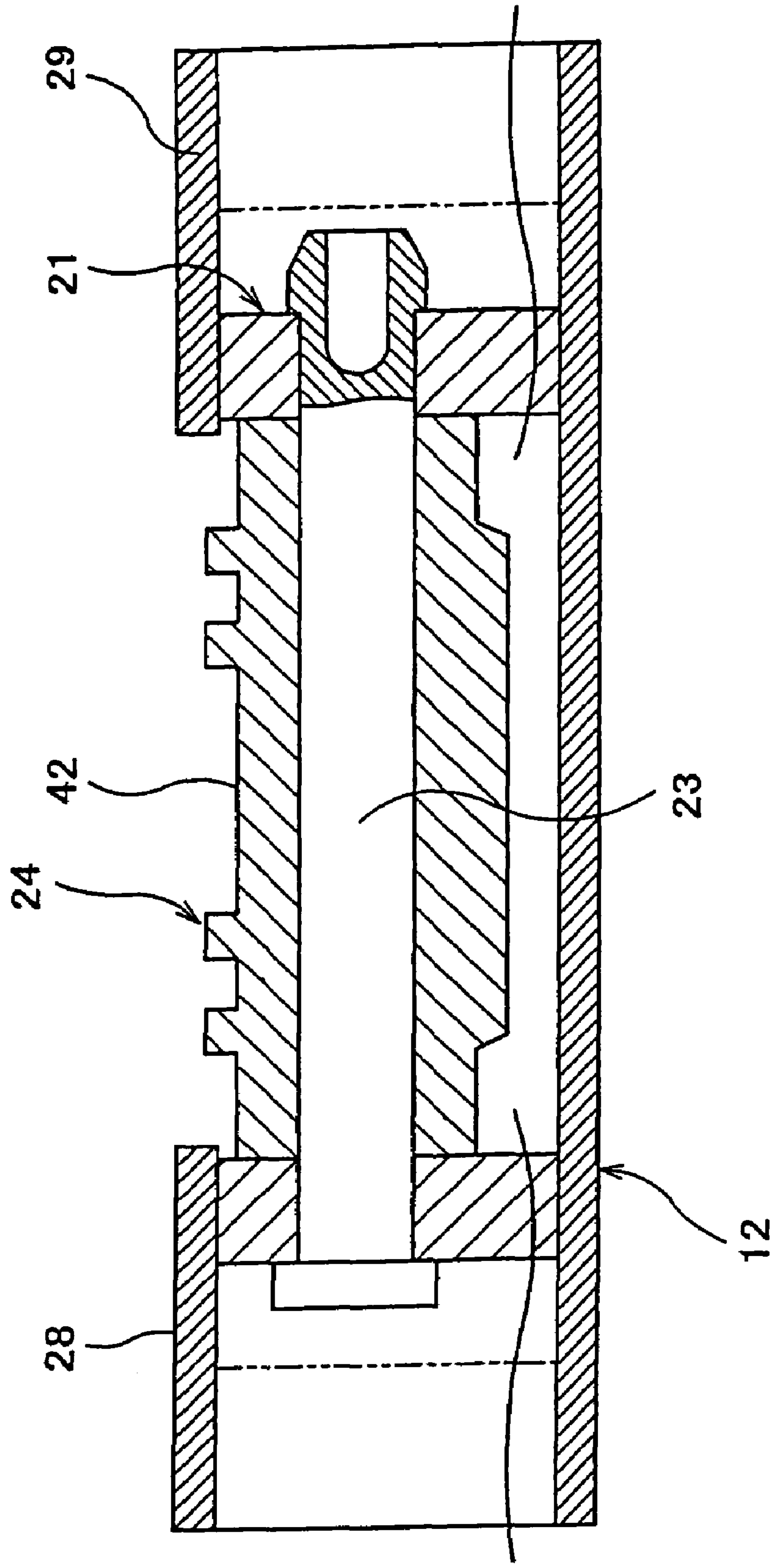
FIG. 11 is a sectional view taken along the line H—H of FIG. 7.

As shown in FIGS. 6 and 10, a connecting lever 51 substantially in the form of a triangle is pivotally supported by the handle base 21 through a pin (pivot shaft) 50 that is made of steel or plastic. As seen in FIGS. 6 and 7, a rod retaining portion (output portion) 57 formed in the upper part (interior side of the vehicle) of the connecting lever 51 is connected to one end of the rod 52 of the door catch device (not shown), so that when the connecting lever 51 rotates in the anticlockwise direction to move the rod 52 in the leftward direction of FIGS. 6 and 7, the door catch device releases the door. The reference numeral 53 shown in FIGS. 6 and 10 denotes a torsion coil spring wound around the connecting lever 51. The torsion coil spring 53 urges the connecting lever 51 in the clockwise direction of FIG. 6.

As seen in FIGS. 6 and 7, the connecting lever 51 has an abutment portion (input portion) 54. A cap member 55 made of elastic material or a low friction material is fitted onto the abutment portion 54. The abutment portion 54 abuts on or engages with the abutment projection 43 of the abutment arm 44 provided on the handle body 24 through the cap member 55. Further, as shown in FIG. 6, the handle base 21 is provided with a stopper 60, while the handle body 24 is provided with a stopper 61, so that the abutment of these stoppers 60, 61 restricts the rotating amount of the handle body 24 relative to the handle base 21.

Operation of the door handle device 4 according to the first embodiment will be described below.

When a driver (or a passenger) rides in the vehicle 1, the driver stands in front of the front door 2 and lifts the handle body 24. The connecting lever 51 engaged with the abutment arm 44 of the handle body 24 is then rotated in the anticlockwise direction of FIG. 7, so that the rod 52 of the door catch device is moved in the leftward direction of the figure. This releases the front door 2 from the door catch device, and when the driver further pulls the handle body 24, the front door 2 is pulled open.

Figure 12:
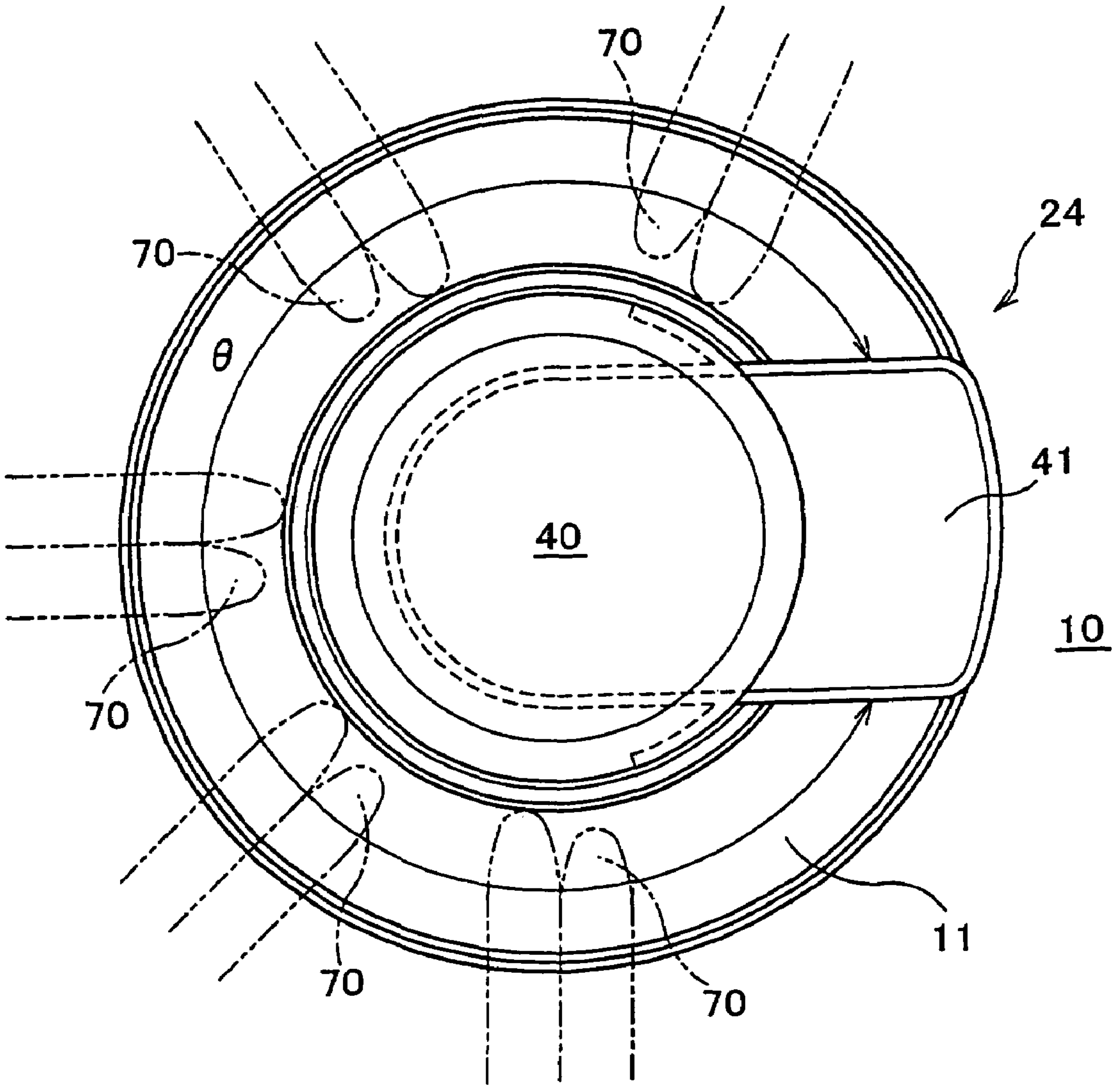
FIG. 12 is a view explaining operation of the door handle device according to one preferred embodiment of the present invention.

In the case where the driver holds a baby or shopping bags with her both hands engaged, she has to open the vehicle door by inserting her fingers only in the direction from top or side of the door handle or from a diagonal direction of the door handle. However, according to this embodiment, the handle body 24 has a circular plate-like finger rest 40. Therefore, as illustrated in FIG. 12, the driver can insert her fingertips 70 into the handle body 24 from three directions including up, down, and rear directions, and the insertion angle, at which the driver can insert her fingertips, is as large as about 250°. This allows the driver to open the front door 2 without the necessity for changing the holding posture of a baby or shopping bags. According to this embodiment, because the periphery of the finger rest 40 curves inward, fingertips of the driver hardly slip off from the finger rest 40, thereby allowing a reliable operation of the door handle device 4.

Meanwhile, if the driver forcefully pulls open the handle body 24, because the stoppers 60, 61 have been abutted on each other, stress is locally focused on the relatively weak fixing part between the support arm 42 and the base 41. However, according to this embodiment, two reinforcement ribs 45, 46 are provided in the proximity of the contact surfaces between the support arm 42 and the base 41. Therefore, a deformation hardly occurs between the support arm 42 and the base 41.

Further, because a pair of upper and lower reinforcement ribs 47, 49 is provided between the finger rest 40 and the cover 48, the handle body 24 has a sufficient stiffness. With the provision of the reinforcement ribs 47, 49 as well as the inwardly curved periphery of the finger rest 40, even if an excessive manipulating force is applied to the finger rest 40, a deformation of the handle body 24 can be prevented effectively. Further, because the handle body 24 can be formed thinner while retaining a sufficient stiffness, even in the case where sufficient depth of the handle accommodating recess 11 is not kept due to the inner handle provided in the vehicle door, it is possible to prevent the handle body 24 from protruding outward of the vehicle body.

Various changes or modifications of the door handle device 4 may be made within the scope of the present invention. For example, the door handle device 4 according to this embodiment has been described as one applied to a front or rear door of an automobile. However, the present invention may be applied to a door handle device provided at the tail gate or the like. Also, the present invention may be applied to a door handle device for other than automobile.

Figure 13:
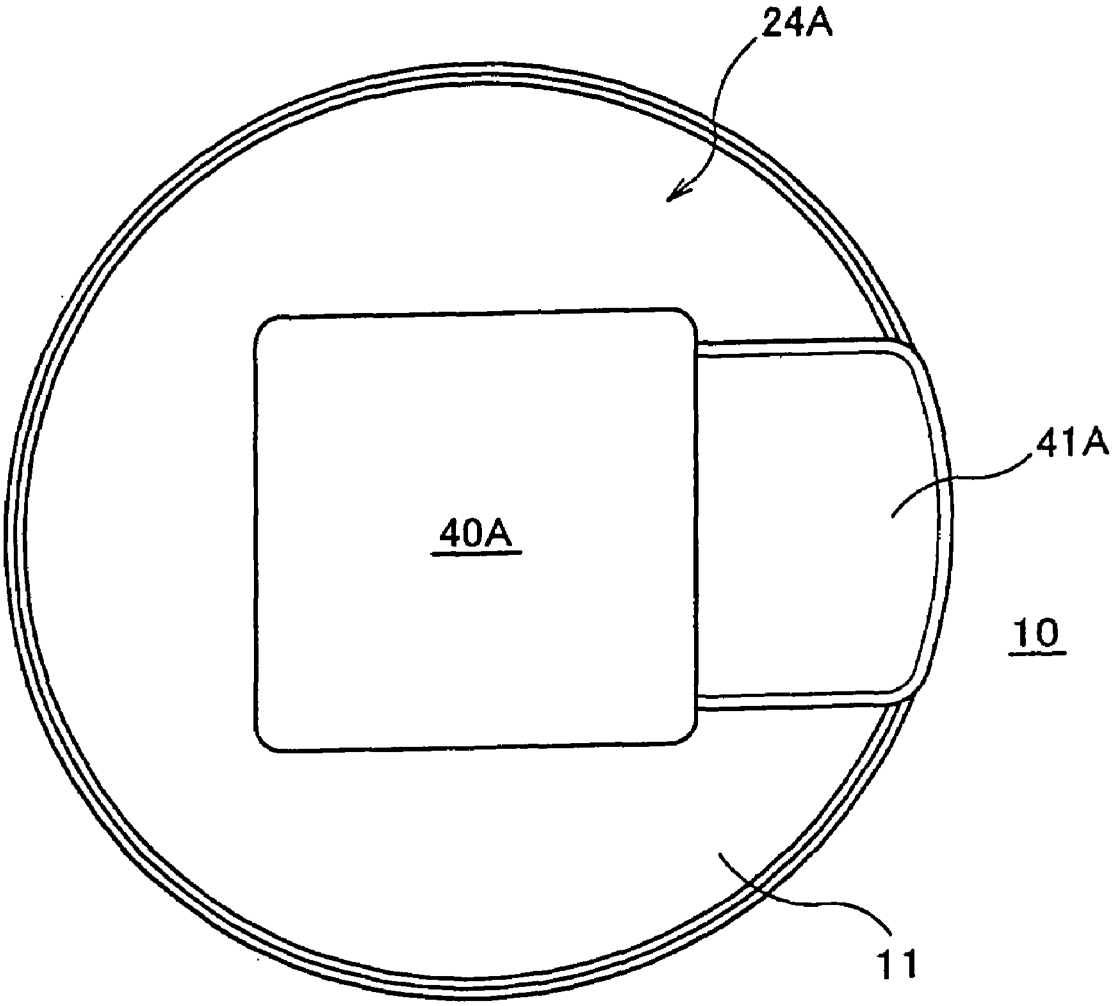
FIG. 13 is a side view illustrating a first modified embodiment of the present invention.
Figure 14:
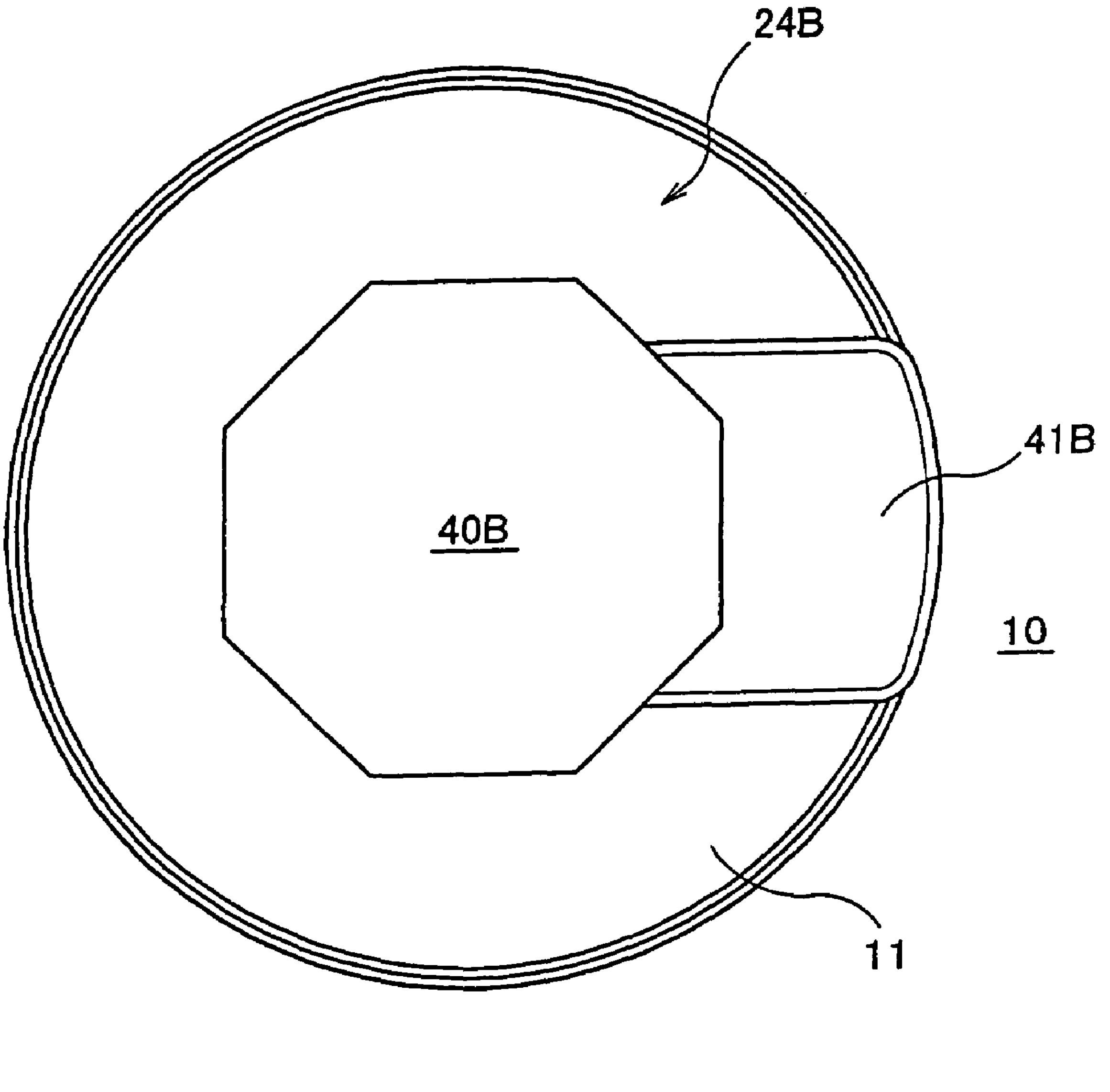
FIG. 14 is a side view illustrating a second modified embodiment of the present invention.

As a first modified embodiment, in place of the handle body 24 having a circular plate-like finger rest 40 and a substantially rectangular-shaped base 41, the handle body 24A may consist of a square finger rest 40A and a base 41A (see FIG. 13). Also, as a second modified embodiment, the handle body 24B may consist of an equilateral octagonal finger rest 40B and a base 41B (see FIG. 14). According to these modified embodiments, operationality of the handle body can be improved for particular angles at which the driver inserts her fingers into the finger rest 40A, 40B.

Figure 15:
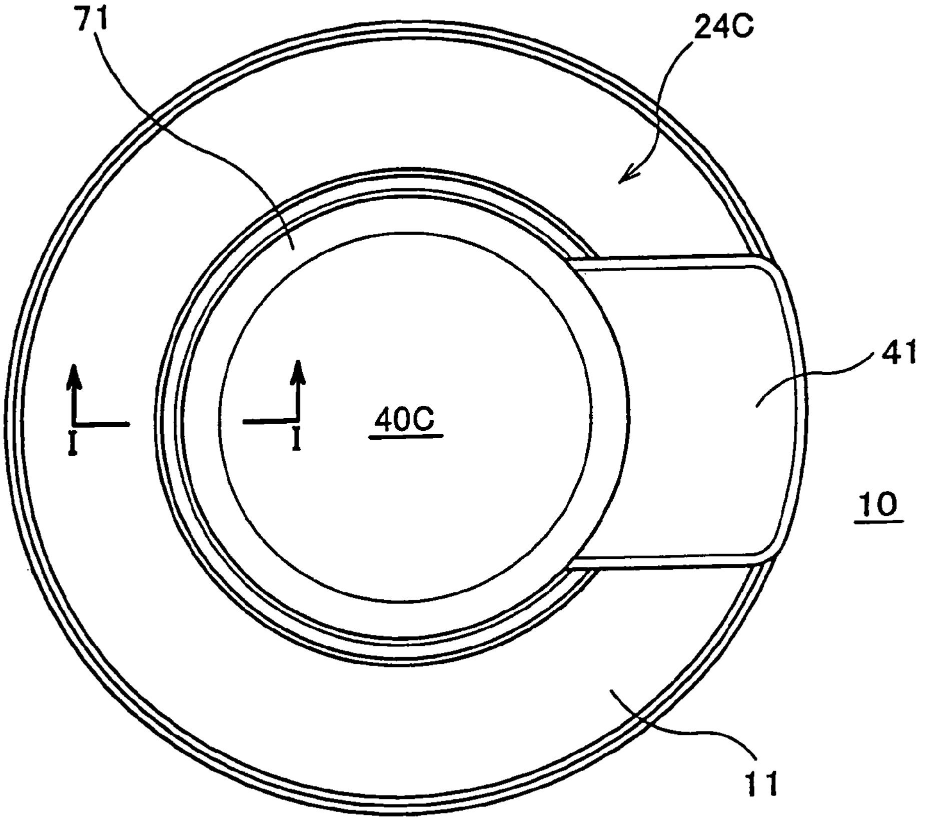
FIG. 15 shows figures illustrating a third modified embodiment, in which (a) is a side view, and (b) is a sectional view taken along the line I—I of (a)
Figure 15:
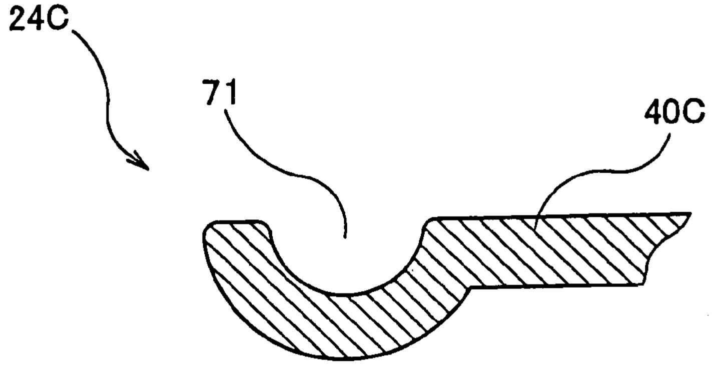
Figure 16:
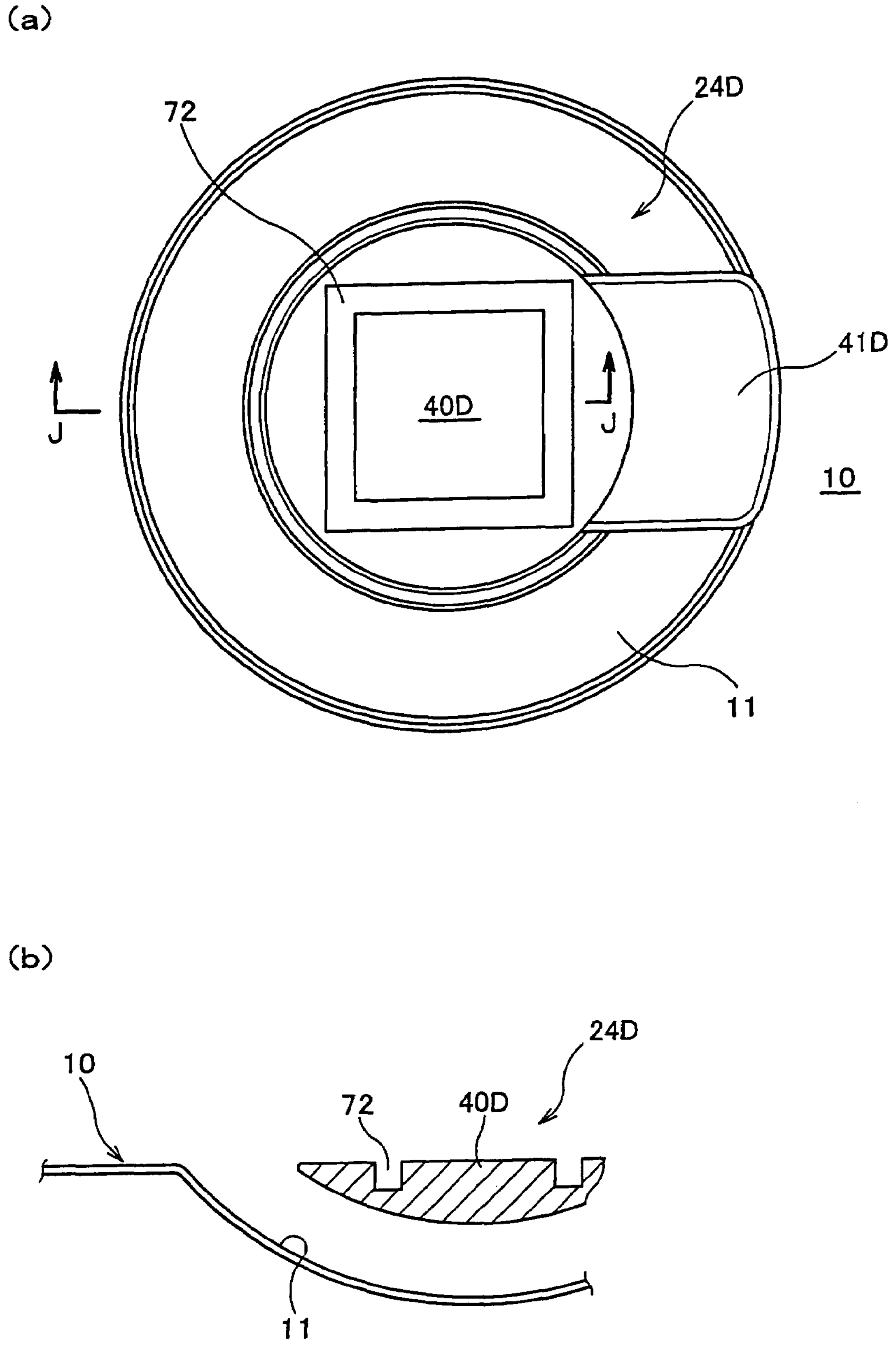
FIG. 16 shows figures illustrating a fourth modified embodiment, in which (a) is a side view, and (b) is a sectional view taken along the line J—J of (a)
Figure 17:
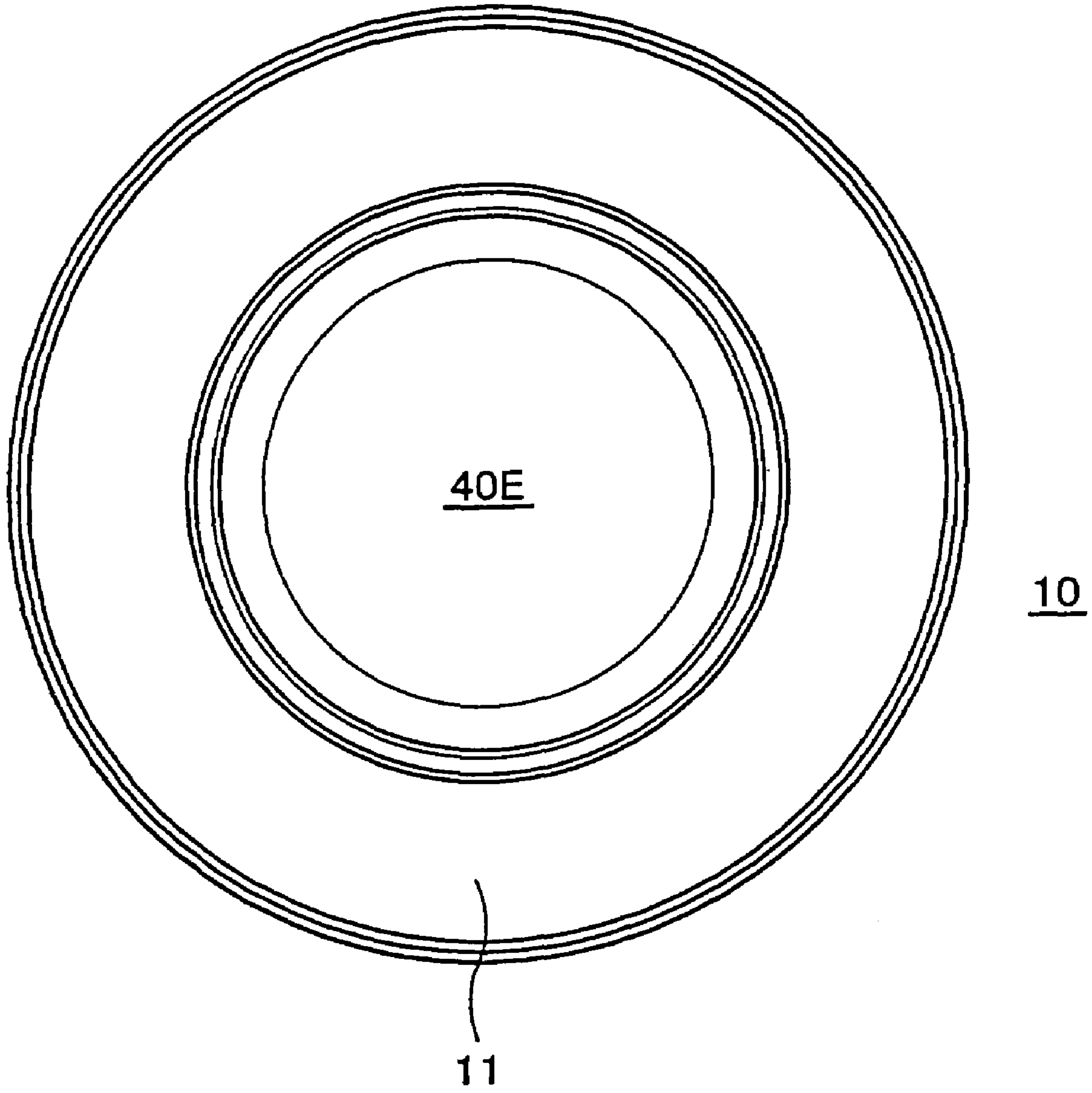
FIG. 17 is a side view illustrating a fifth modified embodiment of the present invention.

As a third modified embodiment, as shown in FIGS. 15(*a*) and (*b*), the handle body 24C may include a finger rest 40C having an annular groove 71 at its outer periphery of the front surface. According to this modified embodiment, fingers are not likely to slip off from the finger rest 40C. As a fourth modified embodiment, as shown in FIGS. 16(*a*) and (*b*), the handle body 24D may include a finger rest 40D having a square groove 72 at its front surface. According to this modified embodiment, weight of the handle body 24D can be decreased, while providing various design variations. Further, as a fifth modified embodiment, the handle body may only consist of a circular (polygonal) plate-like finger rest 40E as illustrated in FIG. 17, so that the driver can insert her fingertips from all the directions throughout 360 degrees. According to this modified embodiment, operation of the handle body can be improved further.

Figure 18:
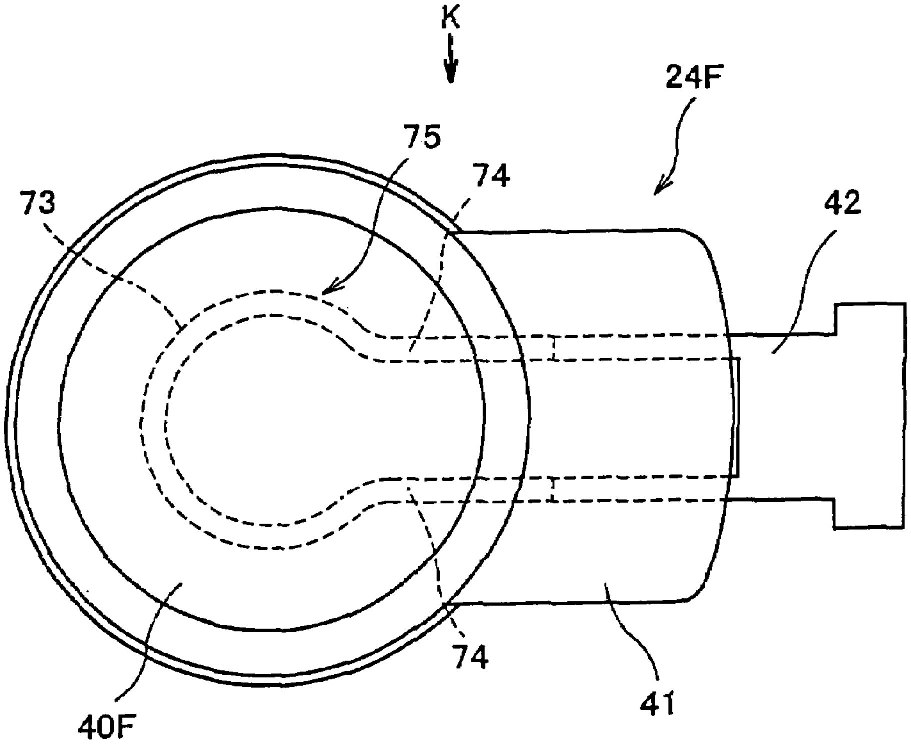
FIG. 18 shows figures illustrating a sixth modified embodiment, in which (a) is a side view, and (b) is a view as viewed from the arrow K of (a)
Figure 18:
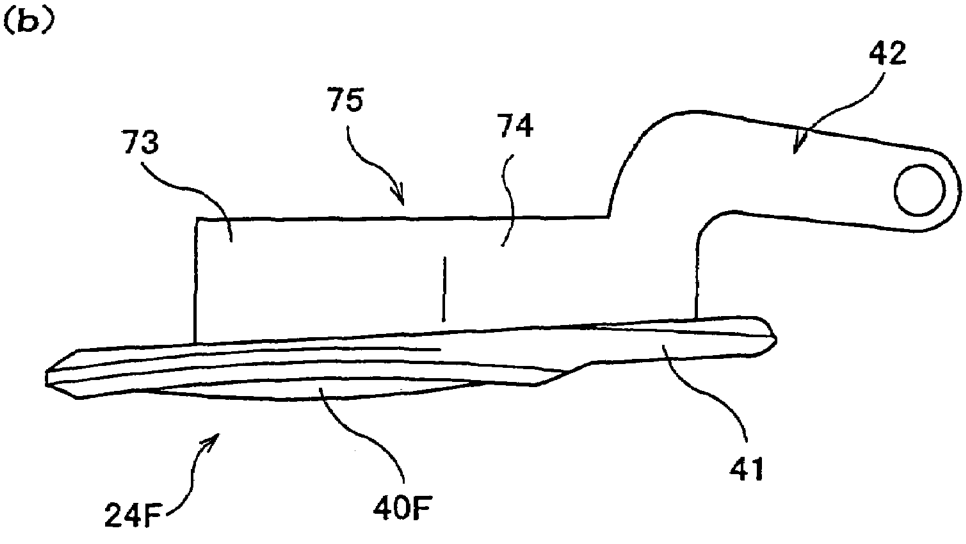
Figure 19:
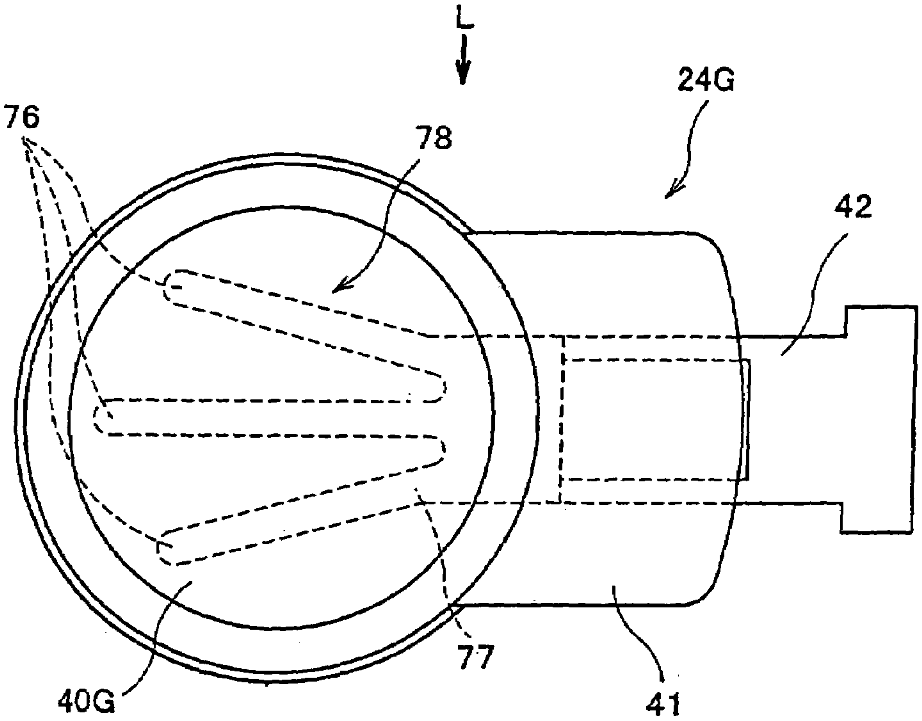
FIG. 19 shows figures illustrating a seventh modified embodiment, in which (a) is a side view, and (b) is a view as viewed from the arrow L of (a)
Figure 19:
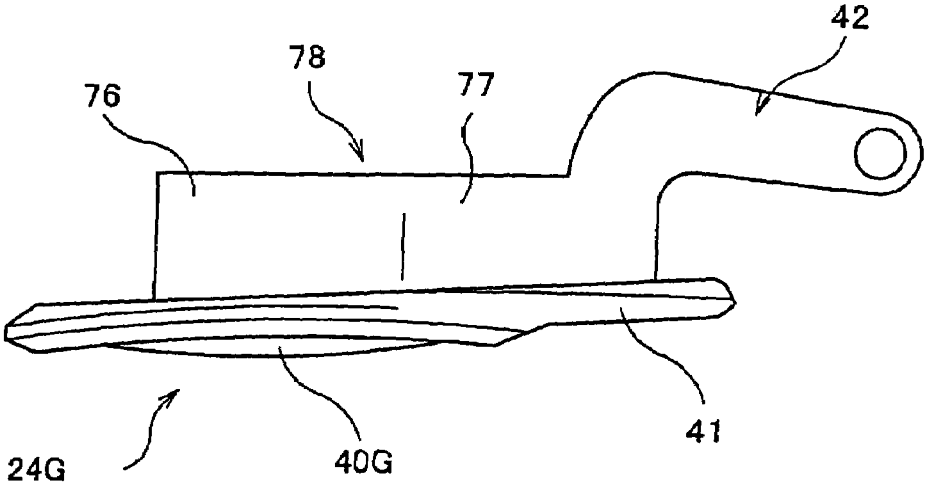

Further, as seen in FIGS. 18(*a*) and (*b*), in place of the two reinforcement ribs 45, 46 provided between the base 41 and the support arm 42, a reinforcement rib 75 which consists of a circular member 73 and a rectangular member 74 may be employed as a sixth modified embodiment. Alternatively, as seen in FIGS. 19(*a*) and (*b*), there may be provided a reinforcement rib 78 which consists of a radially extending member 76 and a rectangular member 77, as a seventh modified embodiment. According to these modified embodiments, because the base 41 and the support arm 42 are joined very strongly to each other, a deformation hardly occurs at the joint therebetween.

Various changes or modifications, such as structure of the door handle device, shape of the handle accommodating recess or the support arm, etc, material of each element, and the insertion angle at which the driver can insert her fingertips into the handle body, may be made without departing from the scope of the present invention.

Figure 20:
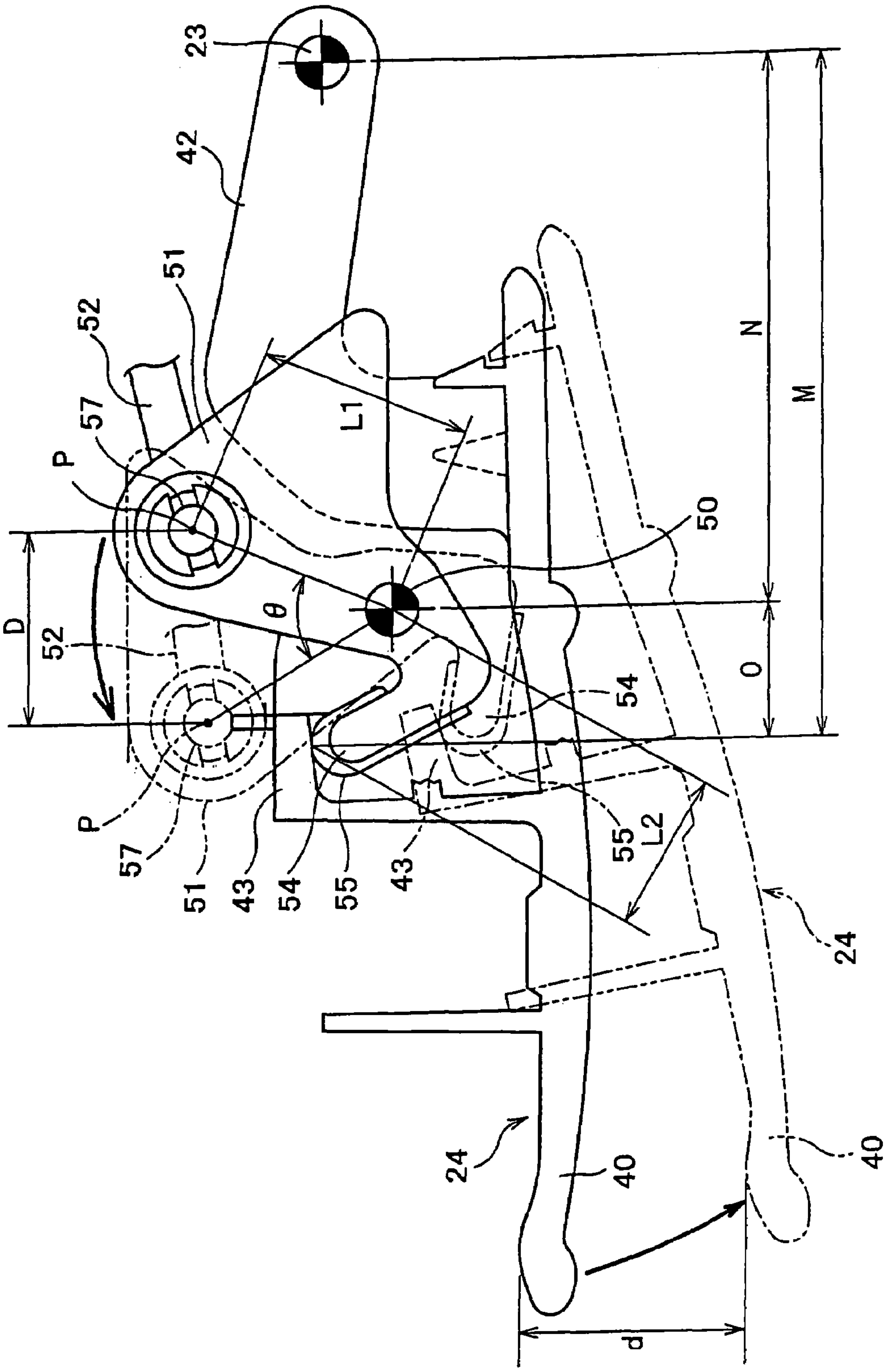
FIG. 20 is a view explaining operations of the handle body and the lever.

Further, when the driver pulls the handle body 24 to open the front door 2, as best seen in FIG. 20, because the distance M between the support shaft 23 and the abutment projection 43 as the engagement portion is sufficiently long, the displacement amount of the abutment projection 43 with respect to the lifting amount of the handle body 24 becomes relatively large. In the connecting lever 51, the distance L1 between the center P of the rod retaining portion (output portion) 57 and the pin 50 is set to be greater than the distance L2 between the abutment portion 54 (actually the cap member 55) as the input portion and the pin 50. Further, the pin 50 is positioned between the support shaft 23 for pivotally supporting the handle body 24 and the finger rest 40, and the distance O between the pin 50 and the abutment projection 43 is set to be smaller than the distance N between the pin 50 and the support shaft 23.

According to the above construction, even if the lifting amount of the handle body 24 (illustrated by "d" in FIG. 20) is small, the displacement angle θ of the connecting lever 51 that is moved by the abutment projection 43 becomes relatively large. The leverage (L1/L2) of the connecting lever 51 is sufficiently large such as of approximately 1.5, so that the rod 52 displaces to a great extent such as shown by the distance D in the figure and releases the door catch device.

Also, according to this embodiment, because the cap member 55 made of an elastic material or a low friction material is fitted onto the abutment portion 54 of the connecting lever 51, it is possible to reduce noise derived from the contact against the abutment projection 43 of the handle body 24 (in the case where the cover member 55 is an elastic member) or to achieve a smooth operation and improved durability (in the case where the cover member 55 is a low frictional material).

Various changes or modifications of the door handle device 4 may be made within the scope of the present invention, and for example, specific structures of the door handle device 4, the connecting lever 51, and other structural elements may be changed or modified.

In the above embodiment, the connecting lever 51 and the door catch device are connected through the rod 52. However, the connecting lever 51 may directly release the door catch device. Such a construction contributes to a reduction in the number of constructing parts, thereby reducing the manufacturing cost and the number of assembling processes. Also, the leverage of the connecting lever 51 is not limited to this specific value shown in the above embodiment, and any arbitrary values may be possible. Further, the engagement between the handle body 24 and the connecting lever 51 is not limited to the slip engagement, and other known engagement such as by means of a pin may be possible.

SECOND EMBODIMENT

With reference to FIGS. 21 to 29, a second embodiment of the present invention will be described below.

Figure 21:
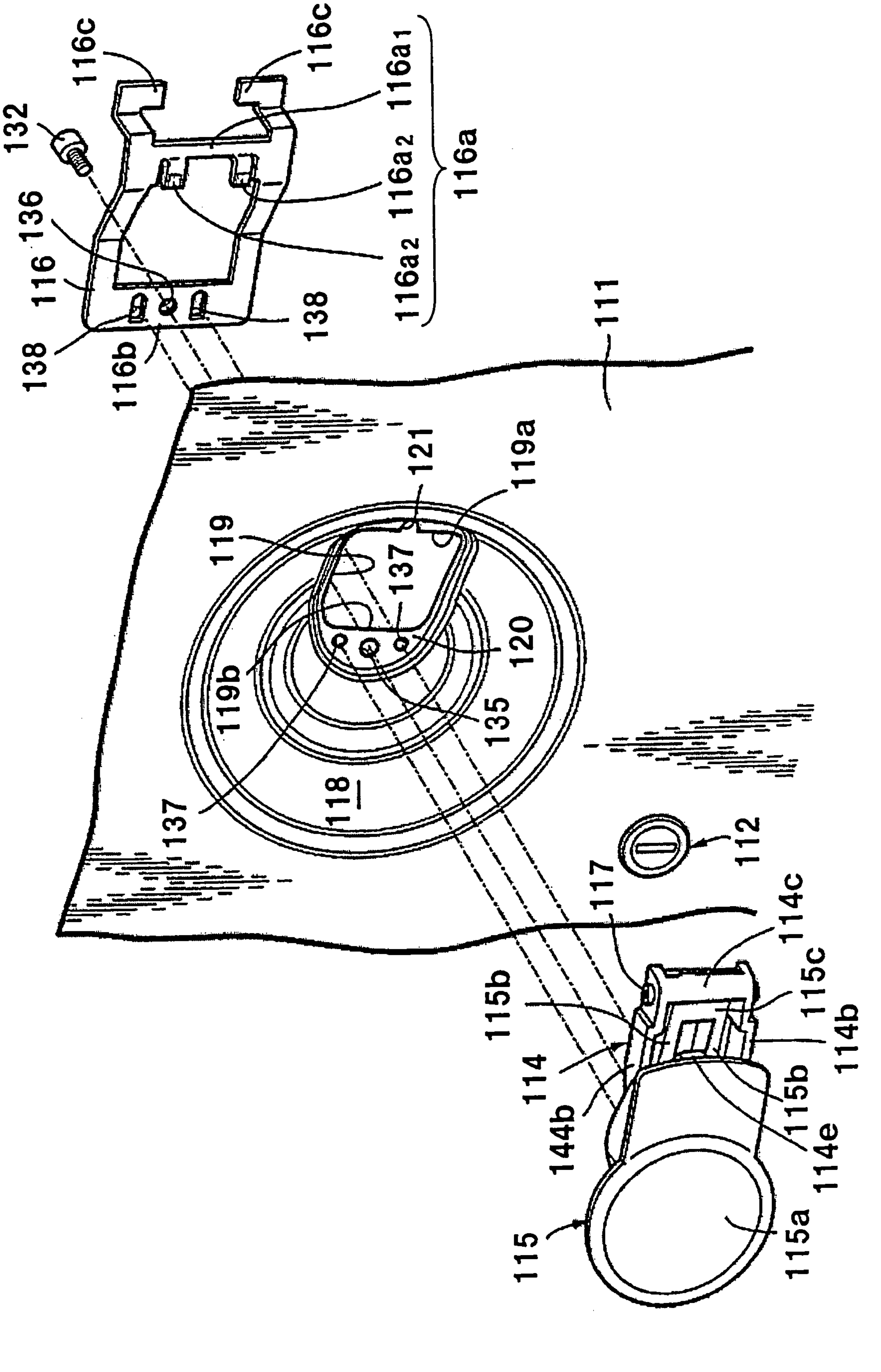
FIG. 21 is an exploded perspective view of the door handle device according to a second embodiment.
Figure 22:
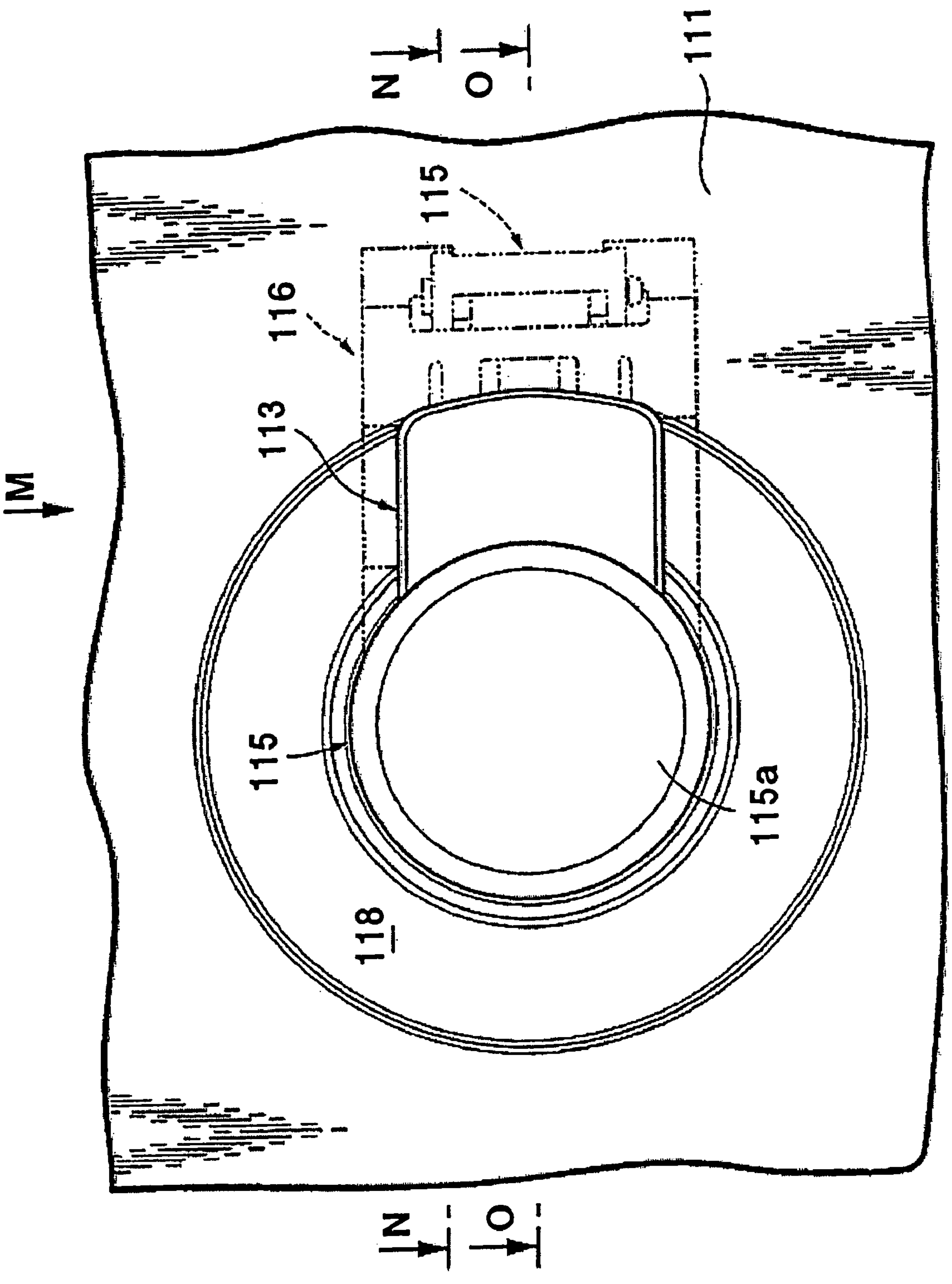
FIG. 22 is a front view of the door handle device shown in FIG. 21.
Figure 23:
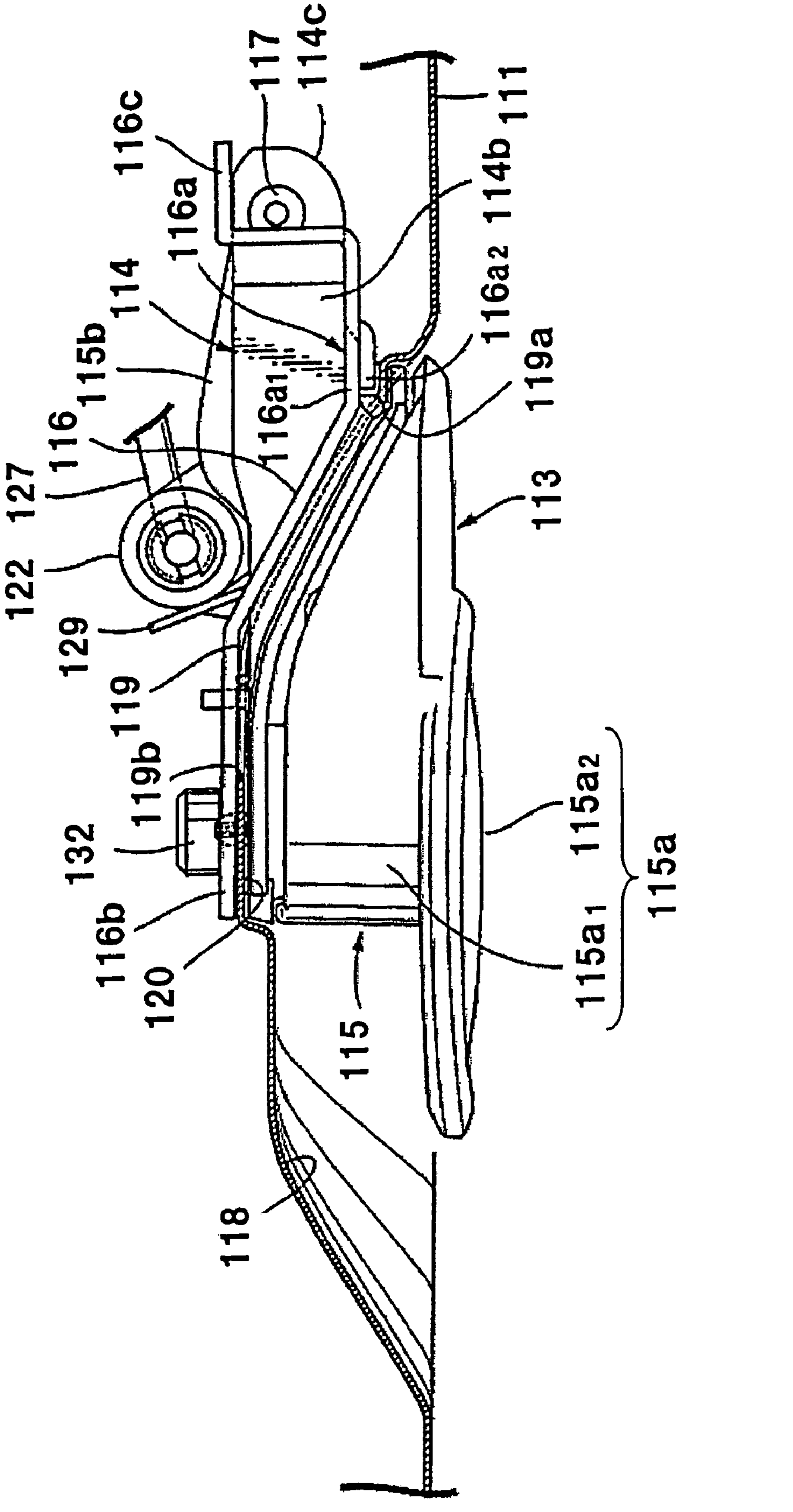
FIG. 23 is a transverse side view of the door handle device as viewed from the arrow M of FIG. 22.

As shown in FIGS. 21 to 23, a door panel 111 used for a vehicle door is provided with a cylinder lock 112 for locking and unlocking a door lock device (not shown) that is arranged between the vehicle body (not shown) and the door panel 111, and a door handle device 113 for opening the door panel 111 when the door lock device is unlocked. The door handle device 113 includes a handle case 114, a door handle 115 pivotally supported by the handle case 114 through a support shaft 117, and a reinforcement plate 116 for mounting the handle case 114 to the door panel 111.

A dish-like recess 118 is dented inwardly at an outer surface of the door panel 111. The recess 118 is partly cut off to provide an opening 119 of the door panel 111. The opening 119 is substantially rectangular having a first side 119*a* and a second side 119*b* which are substantially parallel to an axis of the support shaft 117 with the first side 119*a* sandwiched between the support shaft 117 and the second side 119*b*.

As seen in FIGS. 24 to 27, the handle case 114 is made of hard plastic and includes a case main body 114*a* which abuts on the outer surface of the door panel 111 at the periphery of the opening 119, a pair of upper and lower supporting arms 114*b* integral with the case main body 114*a* and extending through the opening 119 toward the interior of the vehicle, and a connecting portion 114*c* integrally connecting the distal ends of the supporting arm 114*b*.

One end of the case main body 114*a* is formed as a barrel shape extending a long a plane substantially parallel to the outer surface of the door panel 111, and the proximal ends of the supporting arms 114*b* are joined integrally to the other end of the case main body 114*a* in a manner spaced apart to each other. The support shaft 117 is provided between the distal ends of the supporting arms 114*b*.

Figure 28:
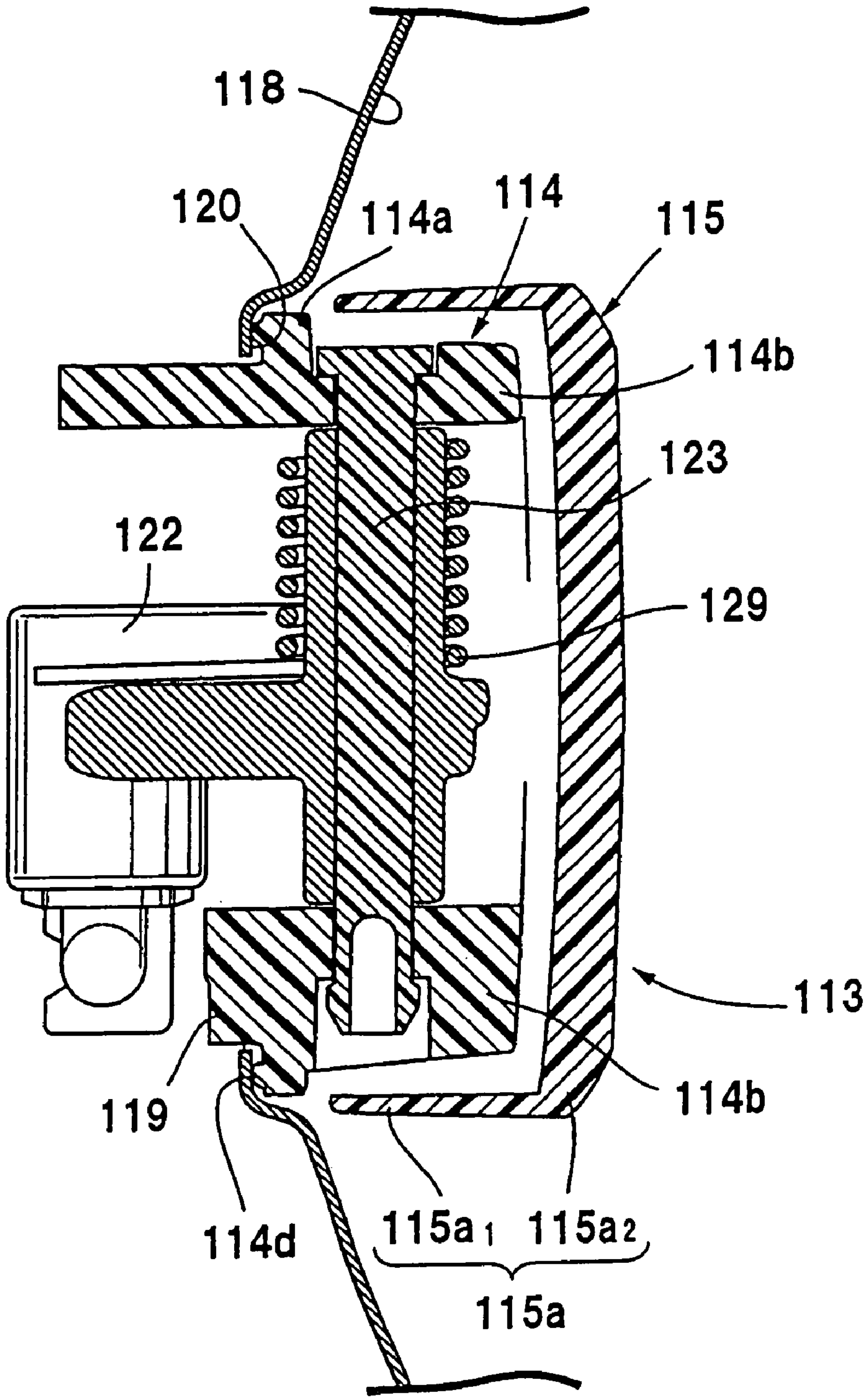
FIG. 28 is a sectional view taken along the line R—R of FIG. 25.

Provided at the outer surface of the door panel 111 and at the periphery of the opening 119 is an abutment seat 120. As seen in FIG. 28, the case main body 114*a* is provided with abutting projections 114*d* at the other end of the case main body 114*a,* so that the abutting projections 114*d* abut on the abutment seat 120 in a manner opposing to the recess 118 of the door panel 111 at the periphery of the opening 119. An engagement recess 121 is provided at an intermediate of the first side 119*a* of the opening 119, and an engagement projection 114*e* of the case main body 114*a* is fitted into and engaged with the engagement recess 121.

The door handle 115 includes a handle 115*a* positioned outside of the door panel 111, a pair of upper and lower arms 115*b* which are integral with the handle 115*a* and extending through the opening 119 toward the interior of the vehicle, and a shaft support portion 115*c* connecting the distal ends of the arms 115*b*. The door handle 115*c* is made of hard plastic.

The handle 115*a* consists of a barrel portion 115*a*1 which covers the case main body 114*a* from the outer side, and a lid portion 115*a*2 which closes the outer end of the barrel portion 115*a*1. The lid portion 115*a*2 extends laterally from the barrel portion 115*a*1 at the opposite side of the support shaft 117, so that the extension of the lid portion 115*a*2 can be held for manipulation.

Figure 29:
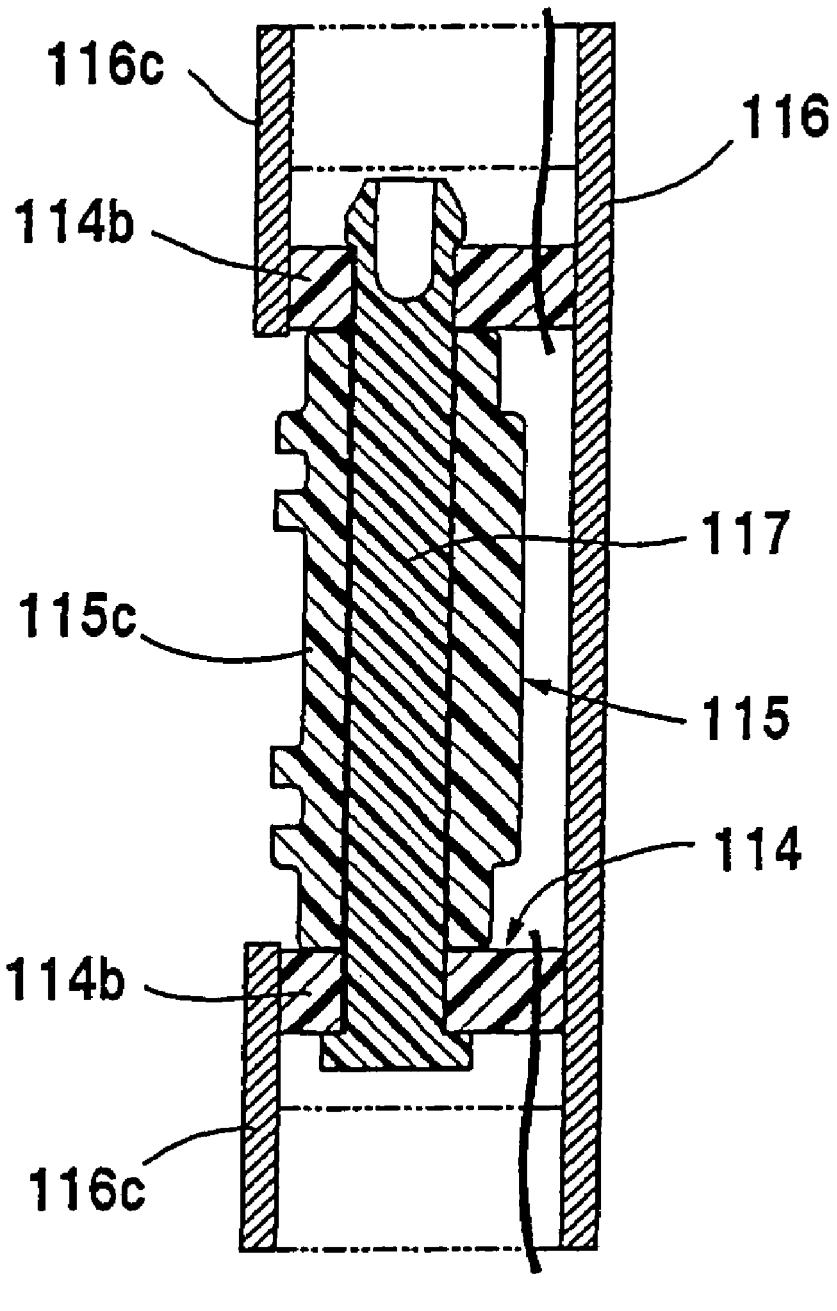
FIG. 29 is a sectional view taken along the line S—S of FIG. 25.

The arms 115*b* have substantially L-shaped cross section, and the proximal ends of the arms 115*b* are spaced apart in vertical direction and integral with the inner surface of the lid portion 115*a*2 of the handle 115*a*. The pair of arms 115*b* is positioned between the supporting arms 114*b* of the handle case 114 so as to extend through the opening 119 toward the interior of the vehicle. As seen in FIG. 29, the shaft support portion 115*c* connecting the distal ends of the arms 115*b* is pivotally supported by the arms 115*b* through the support shaft 117.

A lever 122 is positioned between the supporting arms 114*b* of the case main body 114*a*. The lever 122 is pivotally supported by the shaft 123. The shaft 123 is parallel to the support shaft 117 and extends between the arms 114*b*.

An abutment arm 124 extends integrally from the inner surface of the lid portion 115*a*2 of the handle 115*a* toward the inside of the case main body 114*a*. The abutment arm 124 includes an abutment recess 125 which opens toward the lever 122. An abutment portion 122*a* is integral with the lever 122 and extends toward the abutment recess 125. An elastic cap member 126 is fitted onto the abutment portion 122*a* so that the abutment portion 122*a* abuts on or engages with the abutment recess 125 through the cap member 126. When the door handle 115 turns around the support shaft 117, the lever 122 also rotates through the shaft 123. The lever 122 is connected to one end of a transmission member 127, such as a rod, which transmits the release manipulating force to the door lock device.

Figure 26:
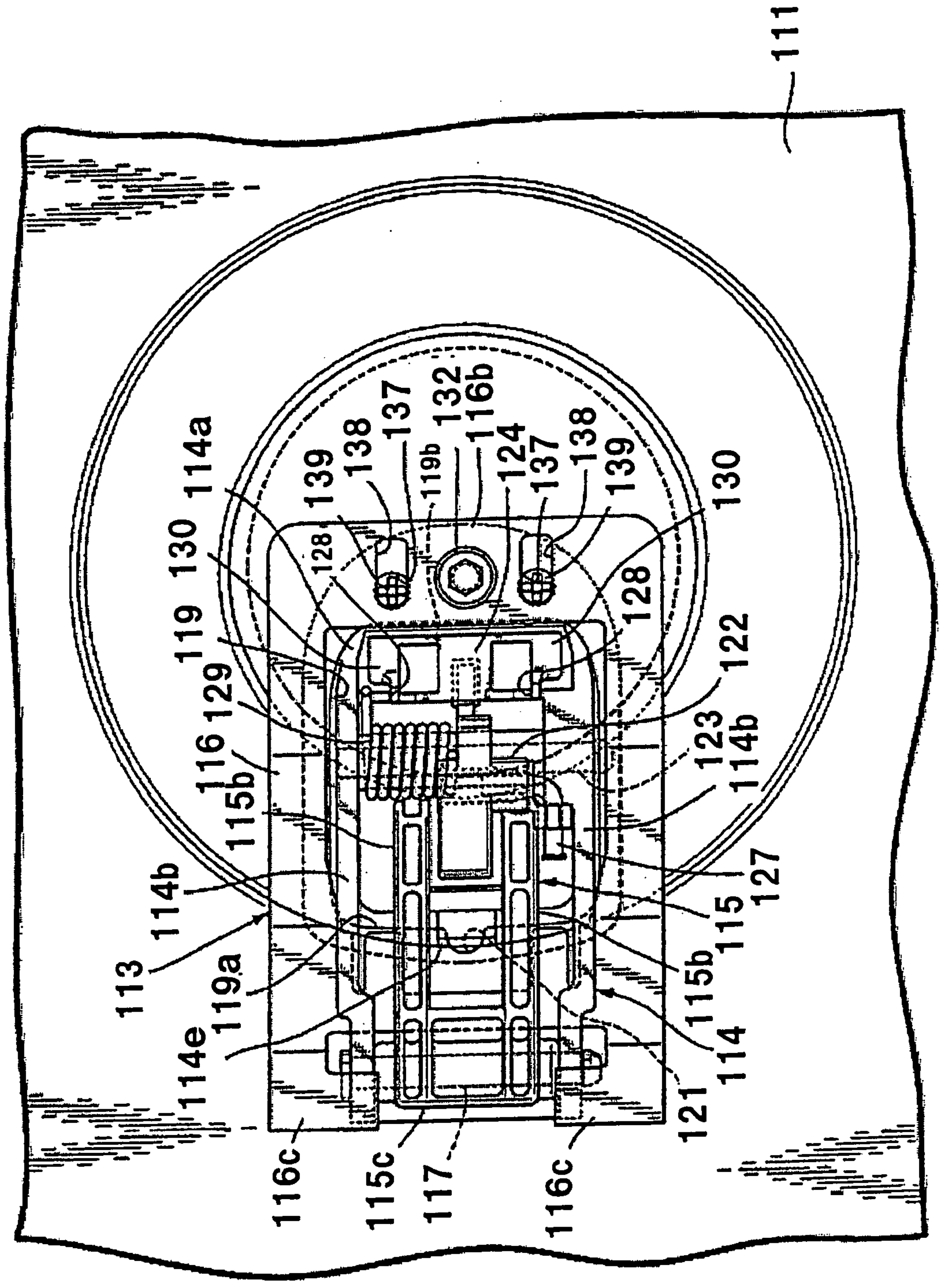
FIG. 26 is a back view as viewed from the arrow P of FIG. 25.
Figure 27:
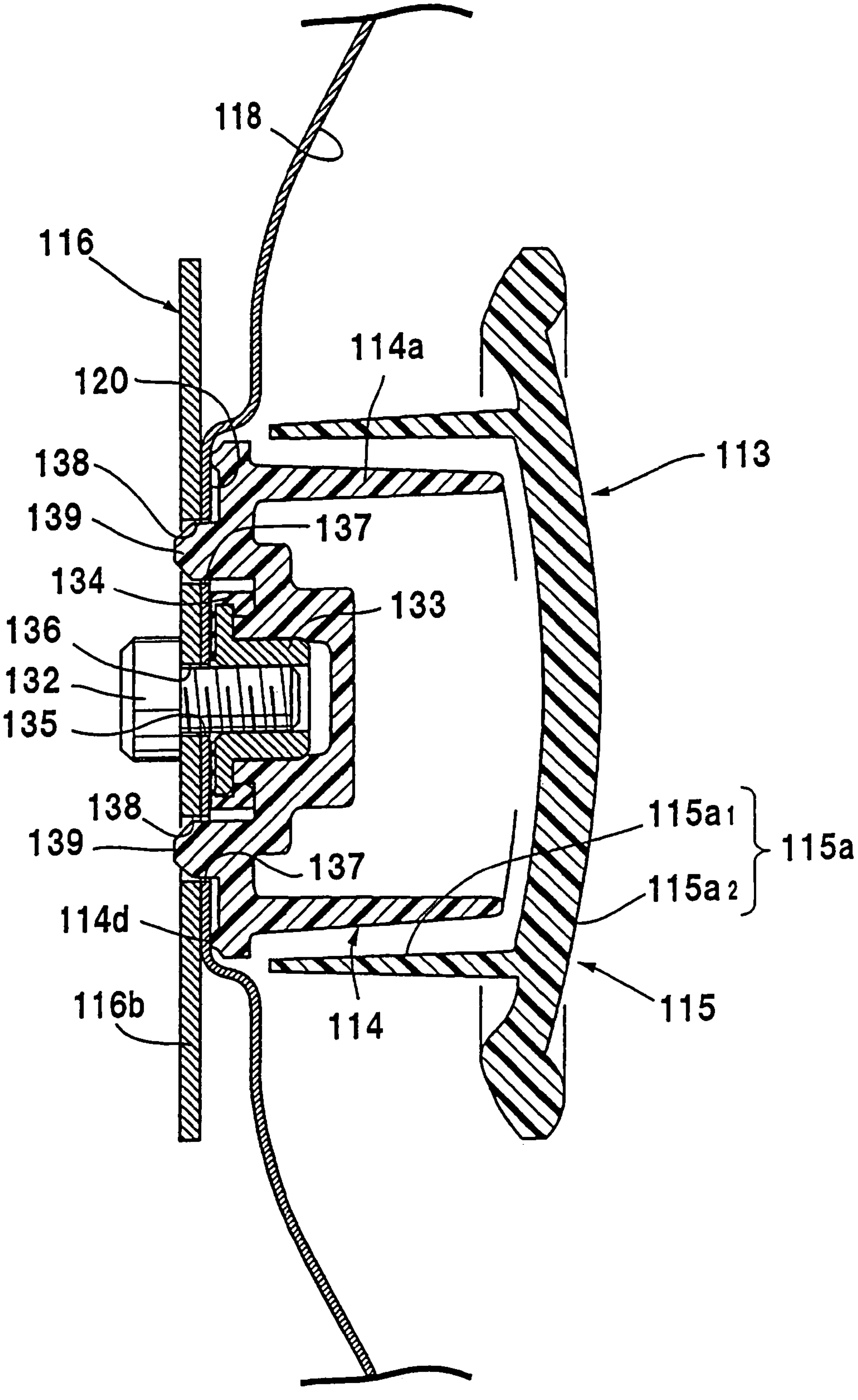
FIG. 27 is a sectional view taken along the line Q—Q of FIG. 25.

As seen in FIG. 26, a pair of guide surfaces 128 is provided at the case main body 114*a* of the handle case 114 so as to slidably guide both side surfaces of the abutment arm 124. Provided between the case main body 114*a* and the lever 122 is a torsion coil spring 129 which applies a spring force to resist the rotating operation of the door handle 115 toward the release direction.

At both upper and lower sides of the distal portion of the abutment arm 124 there are provided stopper projections 130. The case main body 114*a* includes a pair of stoppers 131 which abuts on the corresponding stopper projections 130 to restrict the rotating movement of the door handle 115 toward the opening direction.

The reinforcement plate 116 is made of a metal plate member having sufficient stiffness. The reinforcement plate 116 abuts against the inner surface of the door panel 111 around the periphery of the opening 119. The reinforcement plate 116 includes a sandwiched portion 116*a* for being sandwiched between the door panel 111 and the pair of supporting arms 114*b* of the handle case 114 at the outer side of the first side 119*a* of the opening 119, and a mounting plate portion 116*b* for sandwiching the door panel 111 against the case main body 114*a* at the outer side of the second side 119*b* of the opening 119.

The sandwiched portion 116*a* consists of a plate-like abutment plate portion 116*a*1 which abuts on the supporting arms 114*b* of the handle case 114 from the side of the door panel 111 at the outer side of the first side 119*a,* and a pair of projecting portions 116*a*2 substantially in the form of the letter L and projecting from the abutment plate portion 116*a*1. The projecting portions 116*a*2 contact with the inner surface of the door panel 111.

The mounting plate portion 116*b* has a plate-like shape and contacts with the inner surface of the door panel 111 at the outer side of the second side 119*b*. A screw member 132 is inserted through the mounting plate portion 116*b* and the door panel 111 and threadedly engaged with a nub 133 fixed to the case main body 114*a*.

The nut 133 is fixed to the case main body 114*a* of the handle case 114. The nut 133 is embedded into the handle case 114 during injection molding of the handle case that is made of plastic. An elastic cap 134 that is attached to the nut 133 abuts on the abutment seat 120.

At the outer side of the second side 119*b,* the abutment seat 120 of the door panel 111 and the mounting plate portion 116*b* are respectively provided with insertion holes 135, 136 for inserting the screw member 132, and a pair of positioning holes 137, 138 positioned sandwiching the insertion hole 135, 136 therebetween. The positioning holes 138 provided in the mounting plate portion 116*b* are formed as an oblong hole extending in the front and rear directions. Meanwhile, the case main body 114*a* is provided with a pair of positioning projections 139 each inserted into the positioning holes 137, 138.

The reinforcement plate 116 is further provided with (integral with) a pair of arm support portions 116*c* which abuts on the corresponding supporting arms 114*b* of the handle case 114 from the opposite side of the door panel 111 at the position adjacent to the support shaft 117.

When the door handle device 113 is mounted to the door panel 111, the supporting arms 114*b* of the handle case 114, to which are previously assembled the door handle 115, the lever 122, and the torsion coil spring 129, are inserted through the opening 111 toward the interior of the vehicle (inner side of the door panel 111). At the same time, the case main body 114*a* of the handle case 114 is positioned such that the abutting projections 114*d* at the other end of the case main body 114*a* abut on the abutment seat 120 at the periphery of the opening 119 and the positioning projections 139 of the case main body 114*a* are inserted into the corresponding positioning holes 137 provided in the abutment seat 120. Next, the reinforcement plate 116 is slid along the inner surface of the door panel 111 from the front side of the vehicle, that is, from the supporting arms 114*b*.

Further, the sandwiched portion 116*a* of the reinforcement plate 116 is sandwiched between the pair of supporting arms 114*b* and the door panel 111 at the outer side of the first side 119*a* of the opening 119, and the positioning projections 139 partly projecting from the positioning holes 137 are inserted into the positioning holes 138 of the mounting plate portion 116*b*, so that mounting plate portion 116*b* contact with the inner surface of the door panel 111 at the outer side of the second side 119*b* of the opening 119. When doing so, because the positioning holes 138 of the mounting plate portion 116*b* are formed as oblong apertures extending in front and rear directions of the vehicle, insertion of the positioning projections 139 into the corresponding positioning holes 138 can be readily made. Finally, the door handle device 113 is mounted to the door panel 111 by inserting the screw member 132 into the insertion holes 136, 135 of the mounting plate portion 116*b* and the door panel 111 and threadedly engaged with the nut 133 fixed to the handle case 114.

Operation of the door handle device 113 according to this preferred embodiment will be described below. The opening 119 provided in the door panel 111 is substantially rectangular and has the first side 119*a* substantially parallel to the axis of the support shaft 117, and the second side 119*b* substantially parallel to the first side 119*a* and positioned for sandwiching the first side 119*a* against the support shaft 117. The reinforcement plate 116, which is made of a metal plate having a sufficient stiffness and which abuts on the inner surface of the door panel 111 at the periphery of the opening 119, is provided with the sandwiched portion 116*a* sandwiched between the supporting arms 114*b* of the handle case 114 and the door panel 111 at the outer side of the first side 119*a*, and the mounting plate portion 116*b* for sandwiching the door panel 111 against the case main body 114*a* of the handle case 114 at the outer side of the second side 119*b*. The reinforcement plate 116 is fixed to the door panel 111 and the handle case 114 by inserting the screw member 132 through the mounting plate portion 116*b* and the door panel 111 and being threadedly engaged with the nut 133 of the case main body 114*a*.

In other words, the reinforcement plate 116 and the handle case 114 can be reliably fixed to the door panel 111 only by sandwiching the sandwiched portion 116*a* between the door panel 111 and the supporting arms 114*b* of the handle case 114 at the outer side of the first side 119*a* of the opening 119 and by fastening the mounting plate portion 116*b*, which sandwiches the door panel 111*a* against the case main body 114*a* at the outer side of the second side 119*b* of the opening 119, to the case main body 114*a*.

Figure 24:
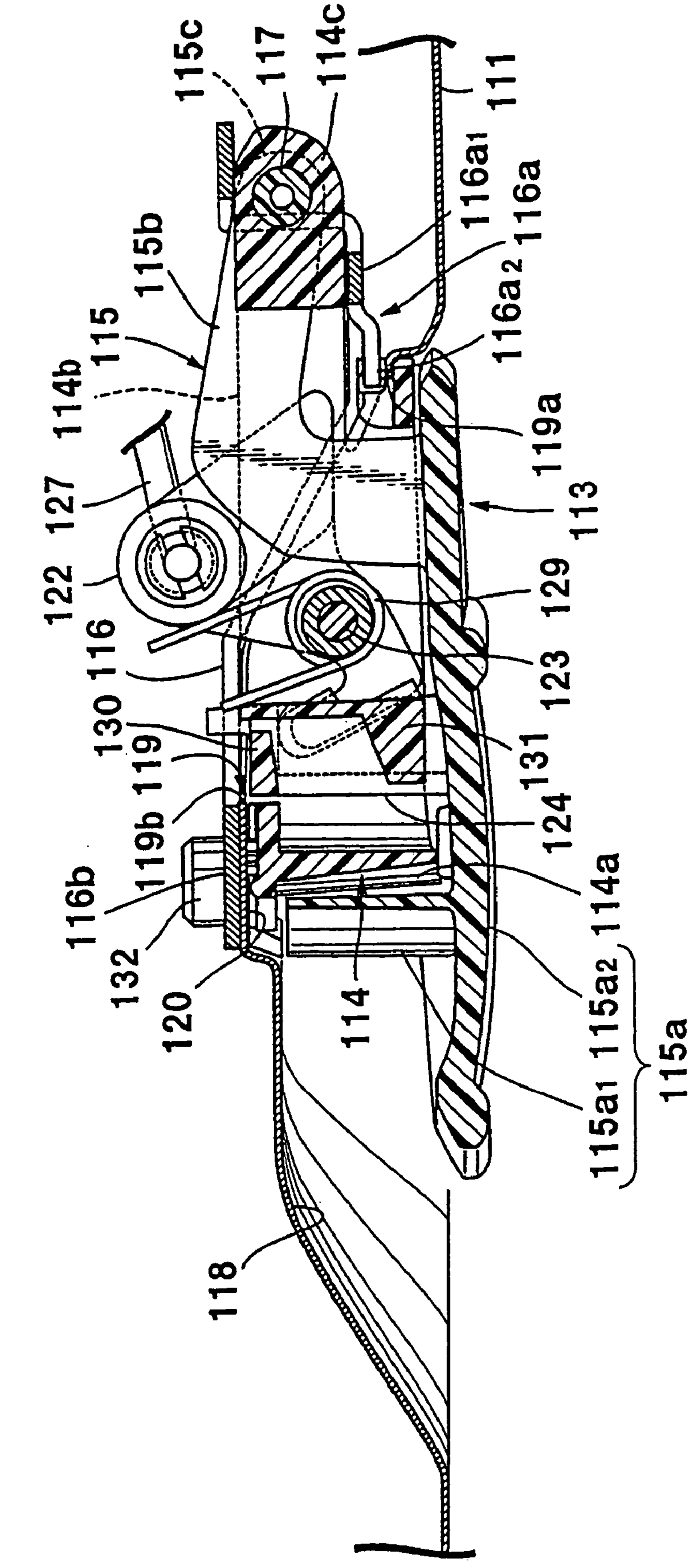
FIG. 24 is a sectional view taken along the line N—N of FIG. 22.
Figure 25:
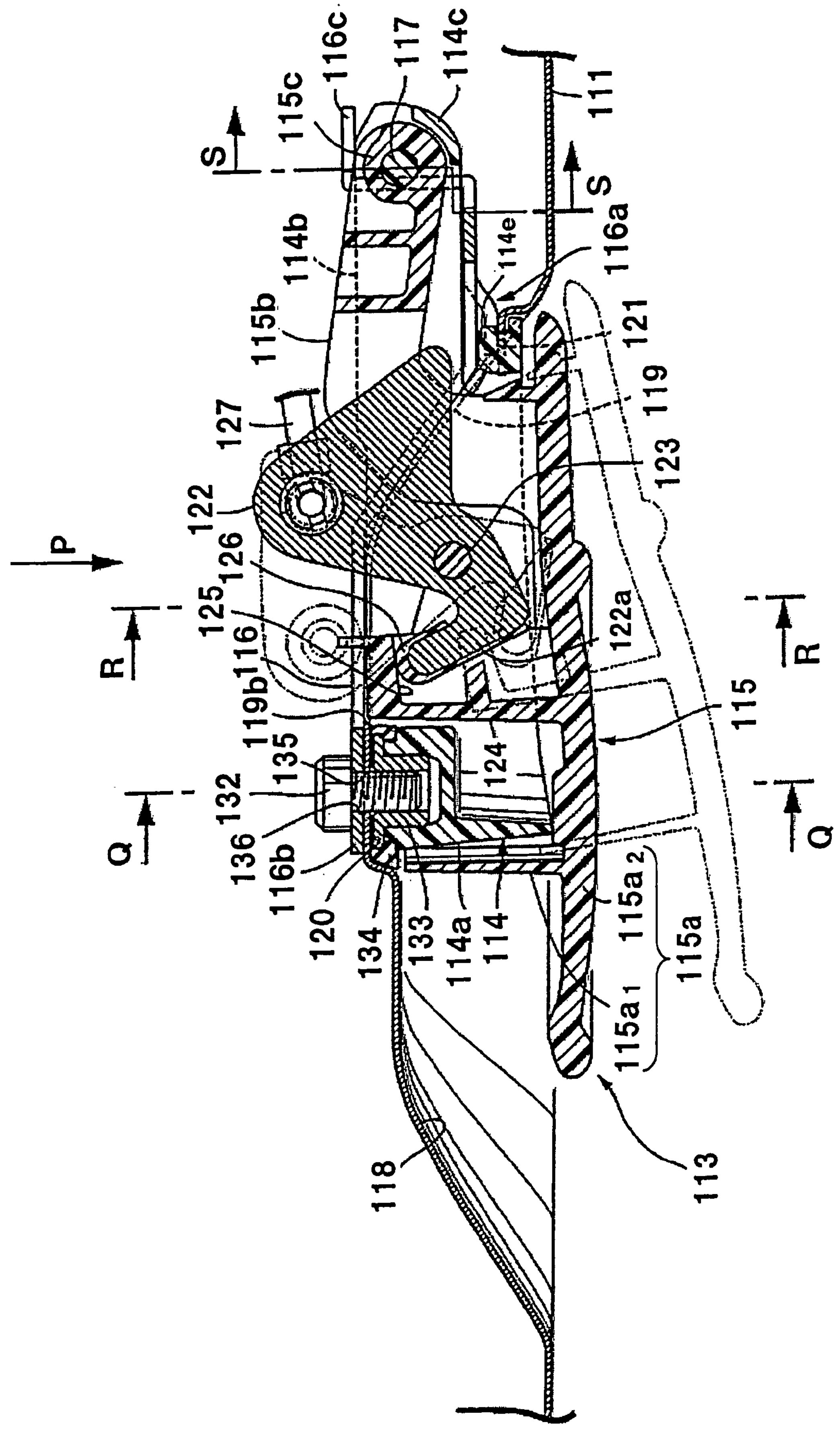
FIG. 25 is a sectional view taken along the line O—O of FIG. 22.

If a further manipulating force is applied to the door handle 115 that is in the rotation restricted position where the stopper projections 130 abut against the stoppers 131, a load is applied to the whole handle case 114 so as to rotate the handle case 114 in the anticlockwise direction of FIG. 24 with the abutment portion between the stopper projections 130 and the stoppers 131 being functioned as a fulcrum. However, because the load from the handle case 114 is transmitted to the reinforcement plate 116, which is abutted on the inner surface of the door panel 111 at the periphery of the opening 119, stress is dispersed around the periphery of the opening 119, thereby preventing a local stress being focused on the door panel 111.

Further, the reinforcement plate 116 is integrally provided with a pair of arm support portions 116*c* each of which abuts on the corresponding supporting arm 114*b* from the opposite side of the door panel 111 at a position adjacent to the support shaft 117. Therefore, even if a further manipulating force is applied to the door handle 115 that is in the rotation restricted position, the arm support portions 116*c* of the reinforcement plate 116 can receive the load applied to the supporting arms 114*b*, thereby preventing a local stress from being focused in the proximity of the support shaft 117 of the supporting arms 114*b*.

Furthermore, the positioning projections 139 projects from the case main body 114*a* of the handle case 114 for being inserted through the positioning holes 137, 138 respectively provided in the door panel 111 and the mounting plate portion 116*b* at the outer side of the second side 119*b* of the opening 119. Therefore, upon mounting the handle case 114 and the reinforcement plate 116 to the door panel 111, the positioning can be made only by inserting the positioning projections 139 into the positioning holes 138, 137 provided in the mounting plate portion 116*b* of the reinforcement plate 116 and the door panel 111, which can ease the screwing operation of the screw member 132. This can improve the assembling efficiency.

While the present invention has been described in detail with reference to specific embodiments thereof, it will be apparent to one skilled in the art that various changes and modifications may be made without departing from the scope of the claims.

What is claimed is:

1. A door handle device for vehicles comprising:

a handle body positioned on an outer surface of a vehicle door and lifted to be pulled back when the vehicle door is opened, wherein the handle body includes a circular plate-like finger rest and a base, said finger rest having an inwardly curved peripheral edge and said base being substantially rectangular in shape and extending continuously from said finger rest such that said base and said finger rest are integrated and substantially coplanar with one another, and wherein a support arm having an L-shaped cross section extends integrally from a reverse surface of the base, and a cover, which is substantially U-shaped, is integrally connected to said finger rest and base and extends away from the finger rest and the base at the reverse surface of the handle body so that said cover extends to the vehicle door when the handle body is pulled out, and wherein the handle body is assembled with the vehicle door such that an outer surface of the handle body is substantially flush with the outer surface of the vehicle door and such that the finger rest is spaced from the outer surface of the vehicle door at least in three continuous directions of four directions including up, down, right and left directions so that the finger rest is accessible so as to be engaged from the three directions.

2. The door handle device for vehicles according to claim 1, wherein an insertion angle of a space between the finger rest and the outer surface of the vehicle door through which the finger rest is accessible is about 250 degrees.

3. The door handle device for vehicles according to claim 1, wherein the support arm is pivotally supported by a support shaft, wherein at the reverse surface of the finger rest and inwardly of the cover there is provided an abutment arm having an abutment projection, wherein the abutment arm engages with a connecting lever that is engaged with a door catch device and pivotally supported by a pivot shaft, and wherein the pivot shaft of the connecting lever is positioned between the finger rest and the support shaft of the handle body.

4. The door handle device for vehicles according to claim 1, wherein a reinforcement rib is provided between the finger rest of the handle body and the cover.

5. The door handle device for vehicles according to claim 1, further comprising a handle base and a reinforcement rib, said handle base supporting the handle body, wherein the support arm is pivotally supported by the handle base; and the reinforcement rib extends between the handle body and the support arm.

6. The door handle device for vehicles according to claim 5, wherein with a finger rest space the handle body is accommodated in a handle accommodating recess formed in the vehicle door.

7. The door handle device for vehicles according to claim 1, wherein the cover extends along a contour of the finger rest.

8. A door handle device for vehicles comprising:

a handle body positioned on an outer surface of a vehicle door and lifted to disengage from a door catch device when the vehicle door is opened;

a finger rest provided at the handle body for lifting the handle body;

a handle base integrally connected to the handle body and extending therefrom, said handle base pivotally supporting the handle body through a rotating shaft such that the handle body turns around the rotating shaft;

a connecting lever pivotally supported by the handle base through a pivot shaft so as to pivot about said pivot shaft and having an input portion and an output portion, said input portion being engaged with an engagement portion of the handle body at a location spaced from said pivot shaft, said output portion being engaged with the door catch device; and wherein the pivot shaft is positioned intermediate the finger rest and the rotating shaft such that a distance between the pivot shaft of the connecting lever and the engagement portion is smaller than a distance between the pivot shaft and the rotating shaft of the handle base and wherein lifting the handle body causes said handle base to turn about the rotating shaft while causing said engagement portion to engage and move said input portion so as to cause said connecting lever to rotate about said pivot shaft and thereby cause said output portion to move the door catch device.

9. The door handle device for vehicles according to claim 8, wherein the engagement portion slidably engages with the input portion of the connecting lever.

10. The door handle device for vehicles according to claim 9, wherein the connecting lever is positioned such that a distance between the output portion and the pivot shaft becomes greater than a distance between the input portion and the pivot shaft.

11. The door handle device for vehicles according to claim 8, wherein the connecting lever is positioned such that a distance between the output portion and the pivot shaft becomes greater than a distance between the input portion and the pivot shaft.

12. The door handle device for vehicles according to claim 8, wherein at least one of the input portion of the connecting lever and the engagement portion of the handle body is provided with an elastic member at its engagement surface.

13. The door handle device for vehicles according to claim 8, wherein at least one of the input portion of the connecting lever and the engagement portion of the handle body is provided with a low friction member at its engagement surface.

14. The door handle device for vehicles according to claim 8, wherein the engagement portion is spaced from the handle base.

15. A door handle device for vehicles comprising:

a handle case including a case main body which abuts on an outer surface of a door panel at a periphery of an opening provided in the door panel, and a pair of supporting arms integral with the case main body and extending through the opening toward an interior of a vehicle, the handle case being fixed to the door panel;

a door handle including a handle positioned outside of the vehicle and being pivotally supported by the supporting arms of the handle case through a support shaft; and, an inwardly dented dish-like recess being provided at the outer surface of the door panel, the recess being partly cut off to provide the opening of the door panel, wherein the opening is substantially rectangular in shape having a first side and a second side which are substantially parallel to an axis of the support shaft with the first side being located relatively between the support shaft and the second side, wherein a reinforcement plate made of metal with a sufficient stiffness includes a sandwiched portion for being sandwiched between the door panel and the supporting arms at an outer side of the first side, and a mounting plate portion for sandwiching the door panel against the case main body at an outer side of the second side, wherein the reinforcement plate abuts on an inner surface of the door panel at the periphery of the opening and is threadedly secured to the case main body through the door panel by a screw member, said screw member being inserted through the mounting plate portion and the door panel and threadedly received in the case main body, wherein the reinforcement plate and the handle case can be reliably fixed to the door panel simply by sandwiching the sandwiched portion between the door panel and the support arms of the handle case at the outer side of the first side of the opening and by fastening the mounting plate portion, which sandwiches the door panel against the case main body at the outer side of the second side of the opening, to the case main body, wherein rigidity is increased at the dish-like recess, and the handle case is fixed on a bottom surface of the dish-like recess, at which rigidity of the dish-like recess is highest and by which a high rigidity portion is provided, wherein a stopper is positioned at the high rigidity portion so that when an operation force is applied to the door handle, a stress derived from the operation force is received by the high rigidity portion, and wherein the stress received by the high rigidity portion is distributed through the reinforcement plate from an area adjacent to the second side of the opening where the mounting plate portion is secured to an area adjacent to the first side of the opening where the sandwiched portion contacts.

16. The door handle device for vehicles according to claim 15, wherein the reinforcement plate includes an arm support portion which abuts on the supporting arms from an opposite side of the door panel at a position adjacent to the support shaft.

17. The door handle device for vehicles according to claim 16, wherein the case main body includes positioning projections for being inserted into corresponding positioning holes provided in the door panel and the mounting plate portion at a position outside the second side.

18. The door handle device for vehicles according to claim 15, wherein the case main body includes positioning projections for being inserted into corresponding positioning holes provided in the door panel and the mounting plate portion at a position outside the second side.

19. The door handle device for vehicles according to claim 15, wherein when an excess manipulating force is applied to the door handle that is in a rotation restricted position where stopper projections abut against stoppers, a load is applied to the whole handle case so as to rotate the handle case in the direction in which the handle case is away from the door panel, with an abutment portion between the stopper projections and the stoppers being functioned as a fulcrum, so that the load from the handle case is transmitted to the reinforcement plate, which is abutted on the inner surface of the door panel at the periphery of the opening , and stress is thus dispersed around the periphery of the opening.

20. The door handle device for vehicles according to claim 19, wherein the reinforcement plate is integrally provided with a pair of arm support portions each of which abuts on the corresponding supporting arm from the opposite side of the door panel at a position adjacent to the support shaft, and wherein when an excess manipulating force is applied to the door handle that is in the rotation restricted position, the arm support portions of the reinforcement plate receives the load applied to the support arms, so that stress is not concentrated in the proximity of the support shaft of the supporting arms.

21. The door handle device for vehicles according to claim 15, wherein the reinforcement plate is integrally provided with a pair of arm support portions each of which abuts on the corresponding supporting arm from the opposite side of the door panel at a position adjacent to the support shaft, and wherein when an excess manipulating force is applied to the door handle that is in the rotation restricted position, the arm support portions of the reinforcement plate receives the load applied to the support arms, so that stress is not concentrated in the proximity of the support shaft of the supporting arms.

22. A door handle device for vehicles comprising:

a handle body positioned on an outer surface of a vehicle door and lifted to disengage from a door catch device when the vehicle door is opened, said handle body including a circular plate-like finger rest and a base, said finger rest being provided on the handle body for lifting the handle body and having an inwardly curved peripheral edge, said base being substantially rectangular in shape and extending integrally and continuously from said finger rest such that said base and said finger rest are integrated and substantially co-planar with one another, said base pivotally supporting the handle body through a rotating shaft such that the handle body turns around the rotating shaft;

a support arm having an L-shaped cross section, said support arm extending integrally from a reverse surface of the base, a cover, which is substantially U-shaped, is integrally connected to said finger rest and base and extends away from the finger rest and the base at the reverse surface of the handle body so that said cover extends to the vehicle door when the handle body is pulled out;

a connecting lever pivotally supported by the handle base through a pivot shaft so as to pivot about said pivot shaft, said connecting lever having an input portion that is engaged with an engagement portion of the handle body at a location spaced from said pivot shaft and an output portion that is engaged with the door catch device;

wherein the pivot shaft is positioned intermediate the finger rest and the rotating shaft such that a distance between the pivot shaft of the connecting lever and the engagement portion is smaller than a distance between the pivot shaft and the rotating shaft of the handle base and said pivot shaft and the rotating shaft are independent from each other; and, wherein the handle body is assembled with the vehicle door such that an outer surface of the handle body is substantially flush with the outer surface of the vehicle door and such that the finger rest is spaced from the outer surface of the vehicle door at least in three continuous directions of four directions including up, down, right and left directions so that the finger rest is accessible so as to be engaged from the three directions.

* * * * *

UNITED STATES PATENT AND TRADEMARK OFFICE

CERTIFICATE OF CORRECTION

PATENT NO. : 7,226,096 B2
APPLICATION NO. : 10/838979
DATED : June 5, 2007
INVENTOR(S) : Ito et al.

It is certified that error appears in the above-identified patent and that said Letters Patent is hereby corrected as shown below:

On the Title Page, Item [73], Assignee, after “Honda Motor Co., Ltd., Tokyo (JP)” insert --Honda Lock Mfg. Co., Ltd., Miyazaki-gun (JP)--.

On the Title Page, Item [57], Abstract, Line 4, delete “which” and insert --that--.

Signed and Sealed this

Seventh Day of August, 2007

JON W. DUDAS
*Director of the United States Patent and Trademark Office*